Jan. 1, 1963 H. F. JURGELEIT 3,070,843
INJECTION MOLDING MACHINE
Filed Aug. 6, 1959 10 Sheets-Sheet 7
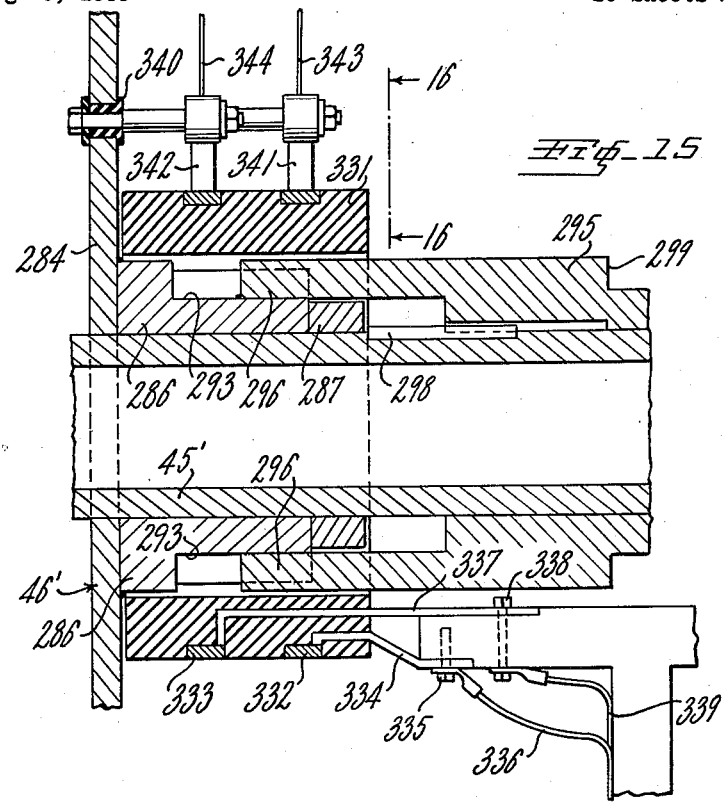
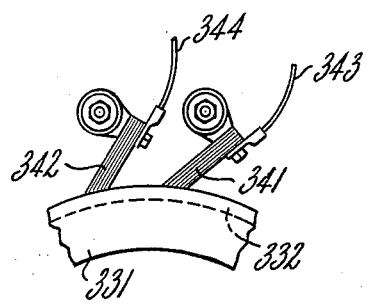
INVENTOR.
HERBERT F. JURGELEIT
BY
Robert J. Patterson
ATTORNEY

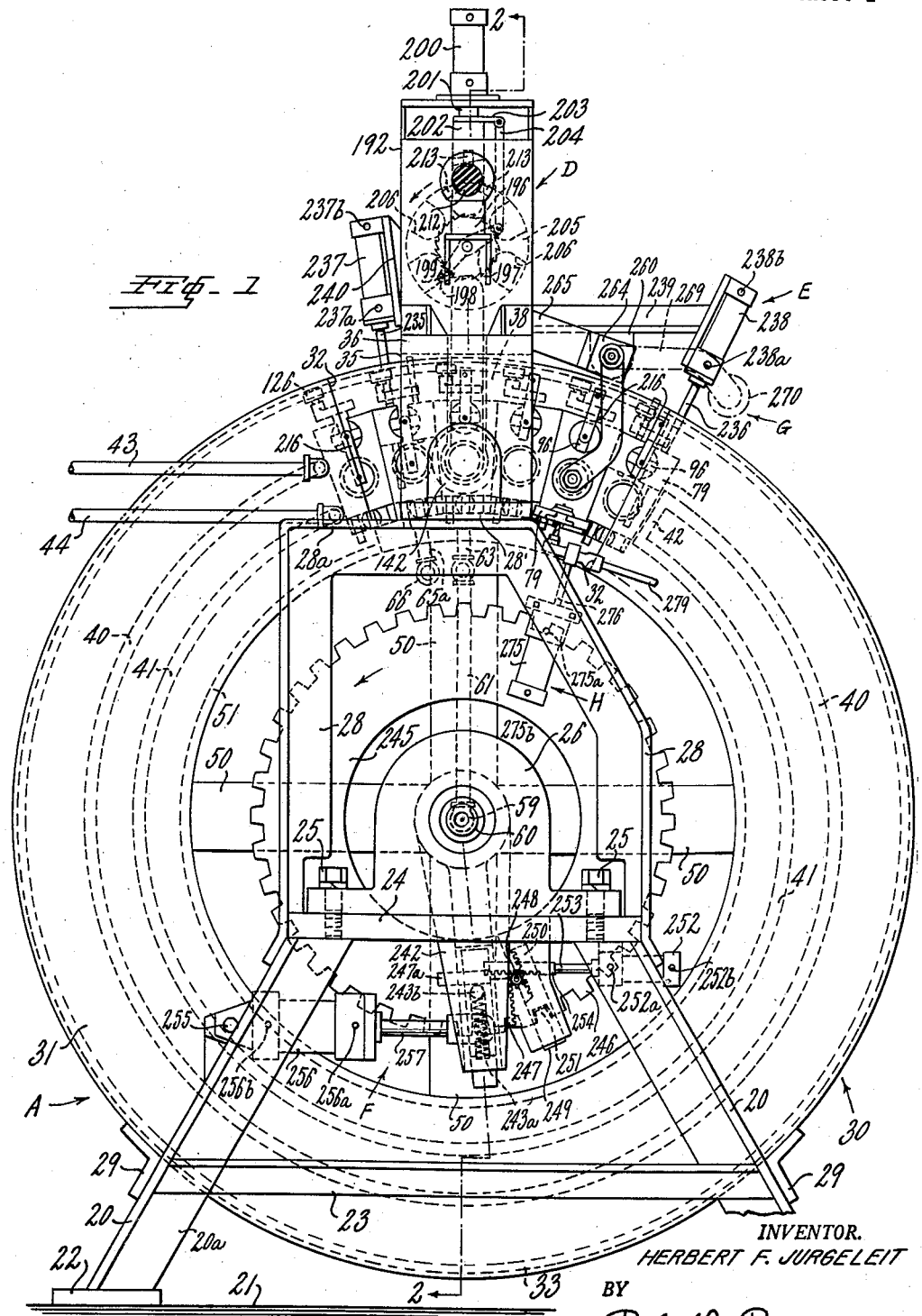

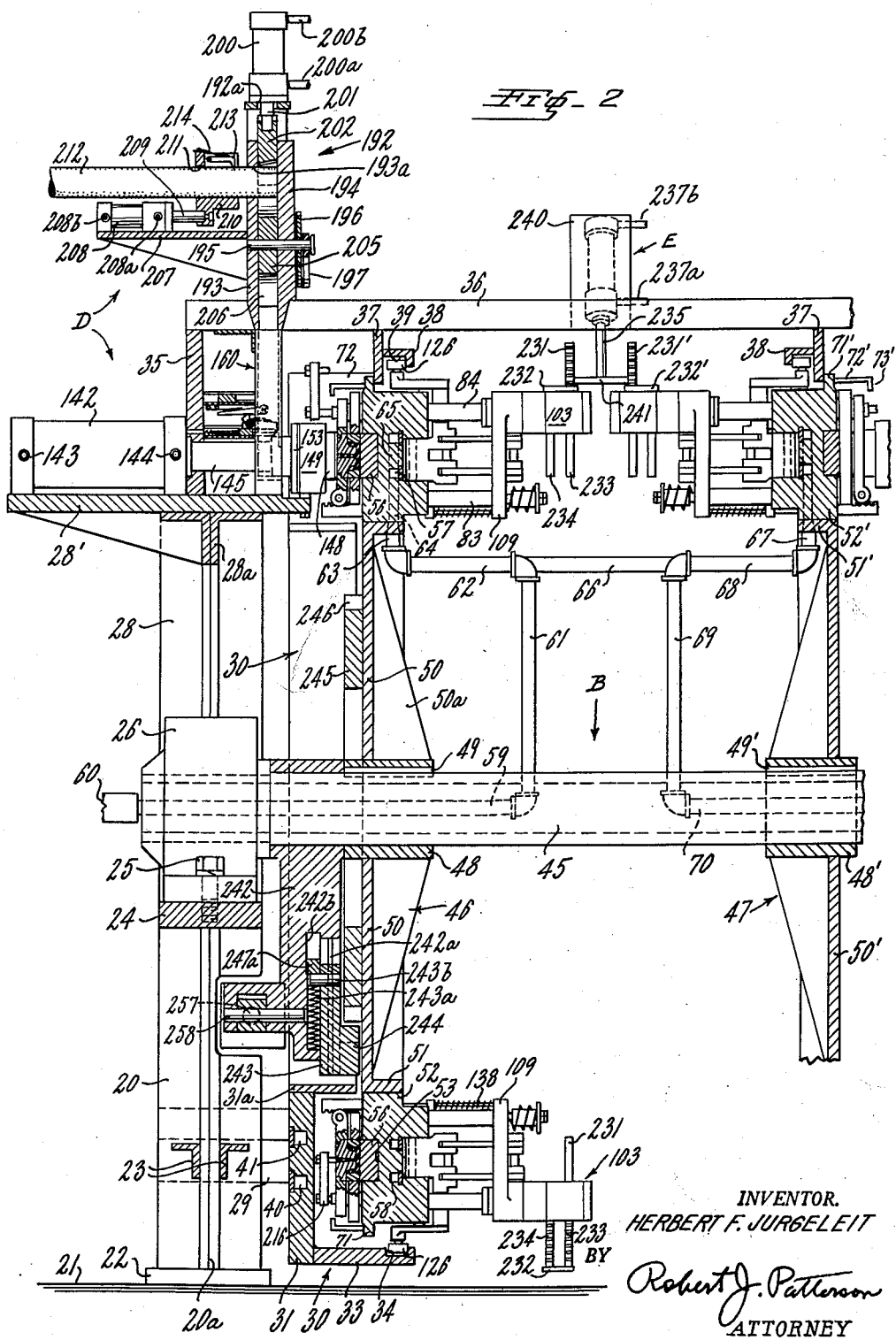

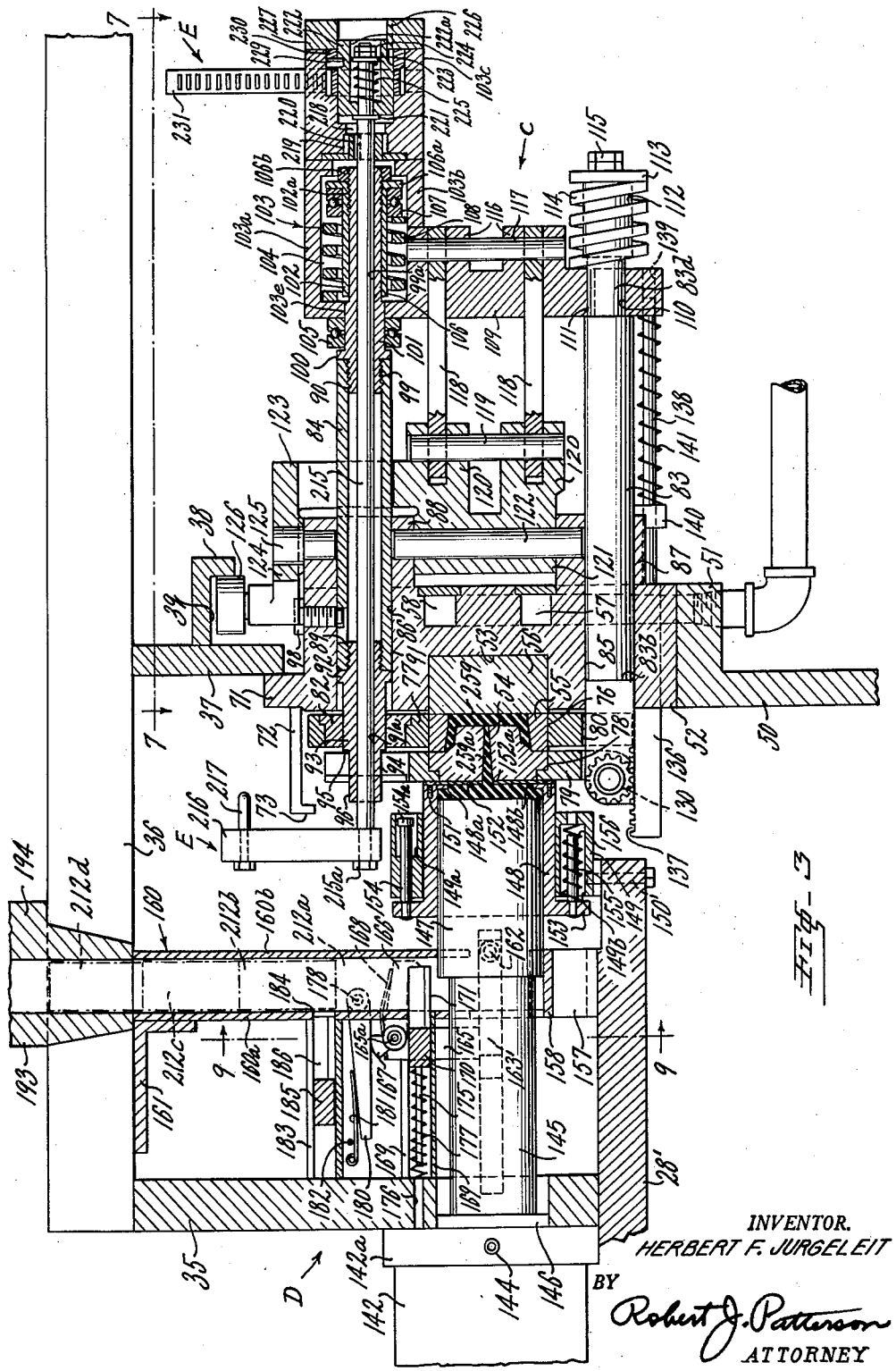

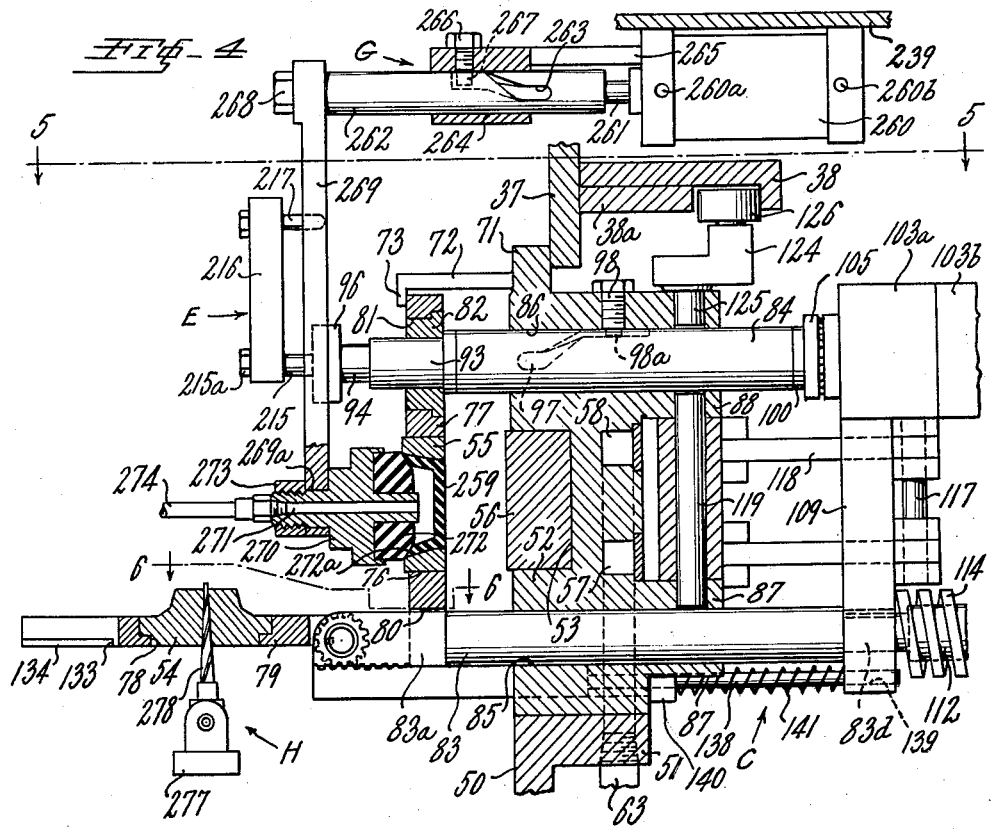
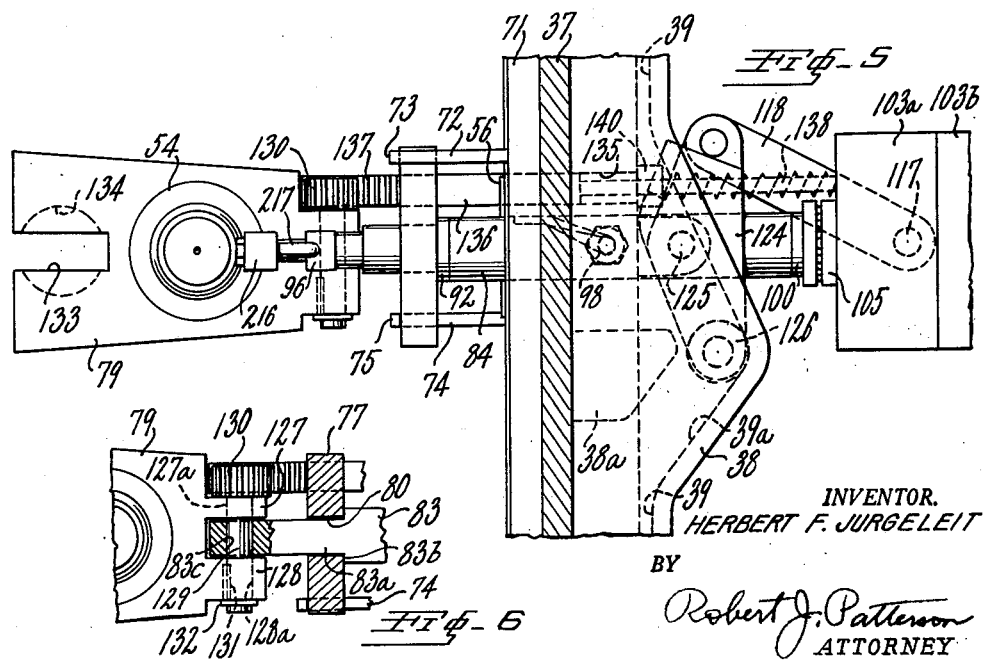

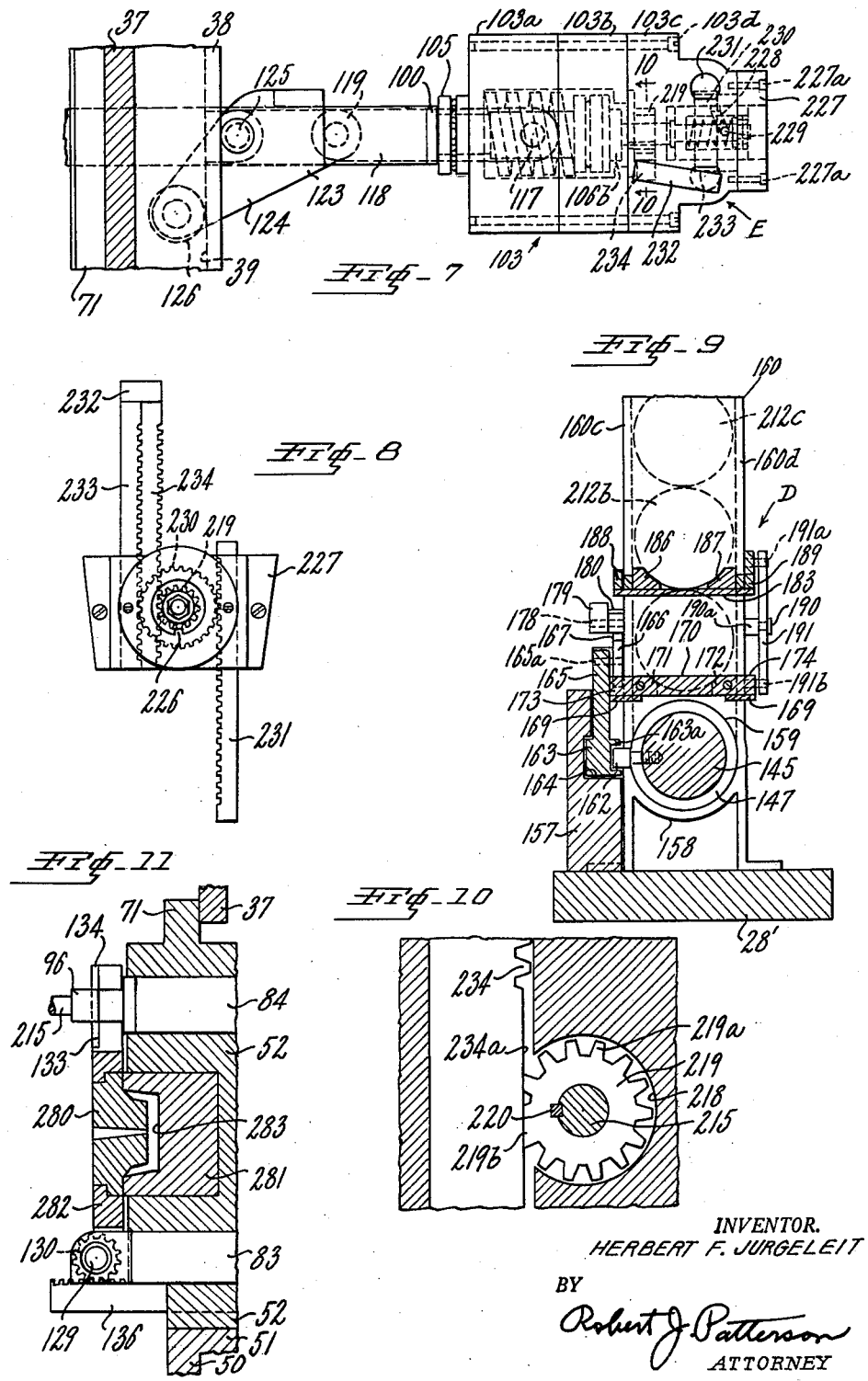

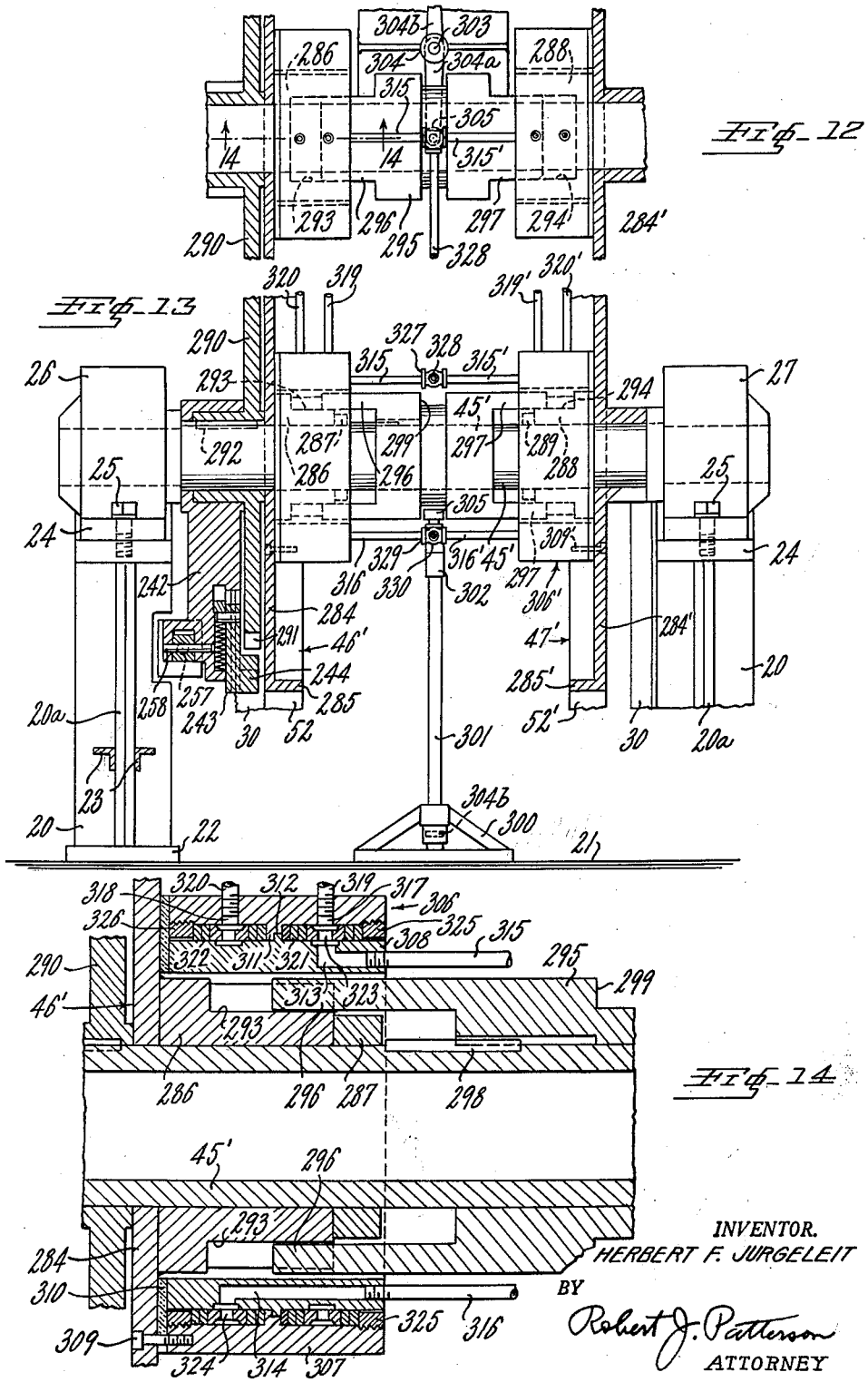

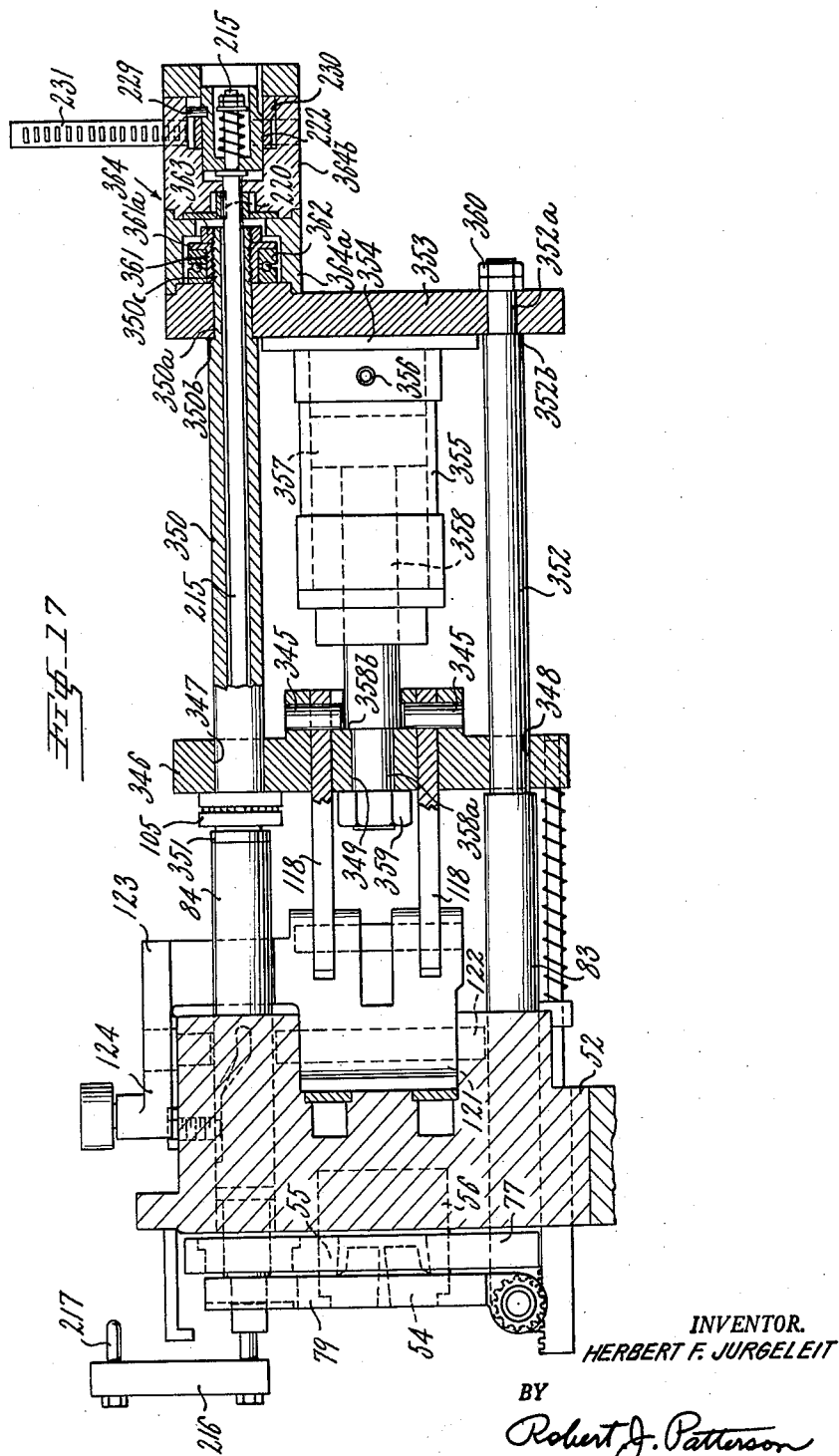

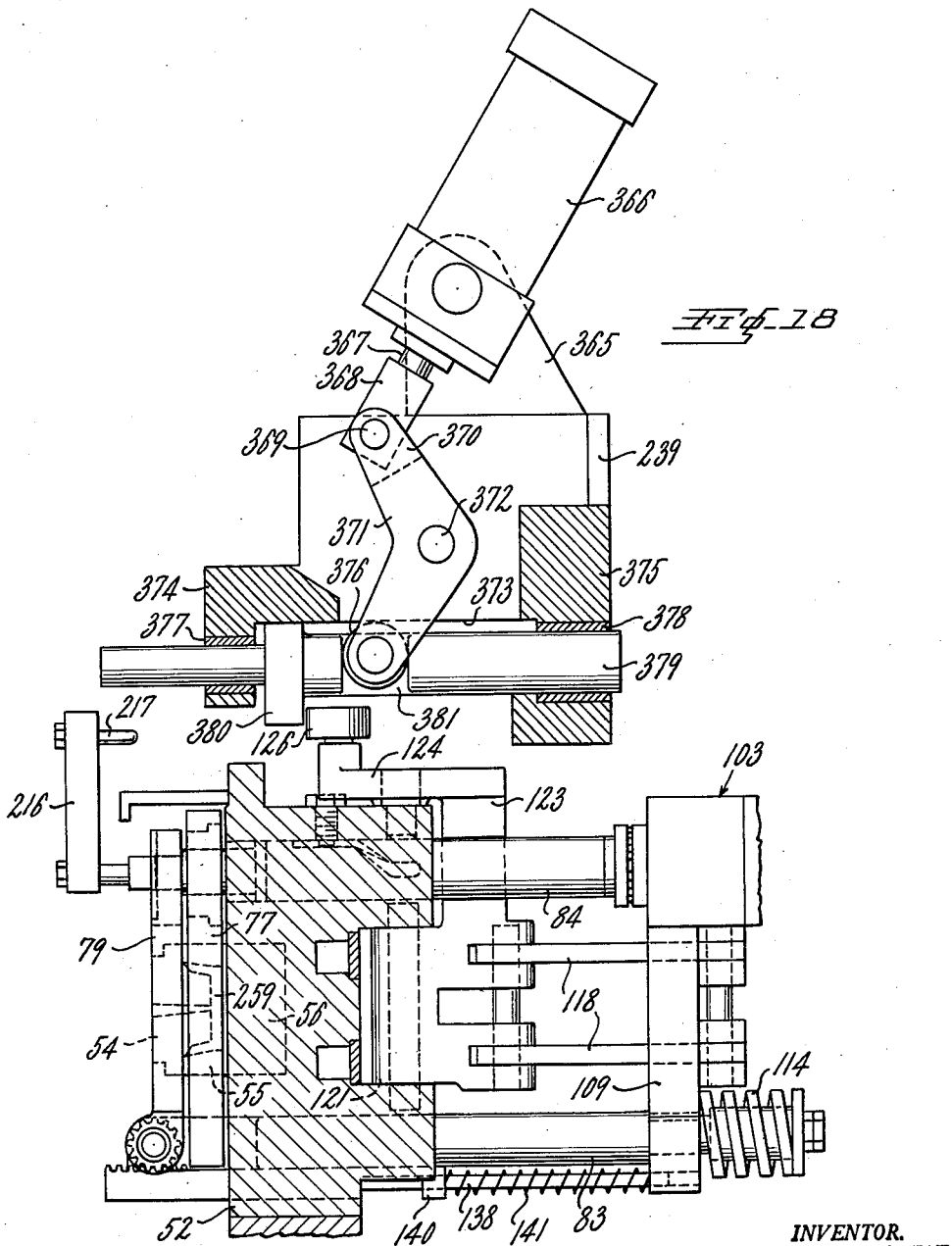

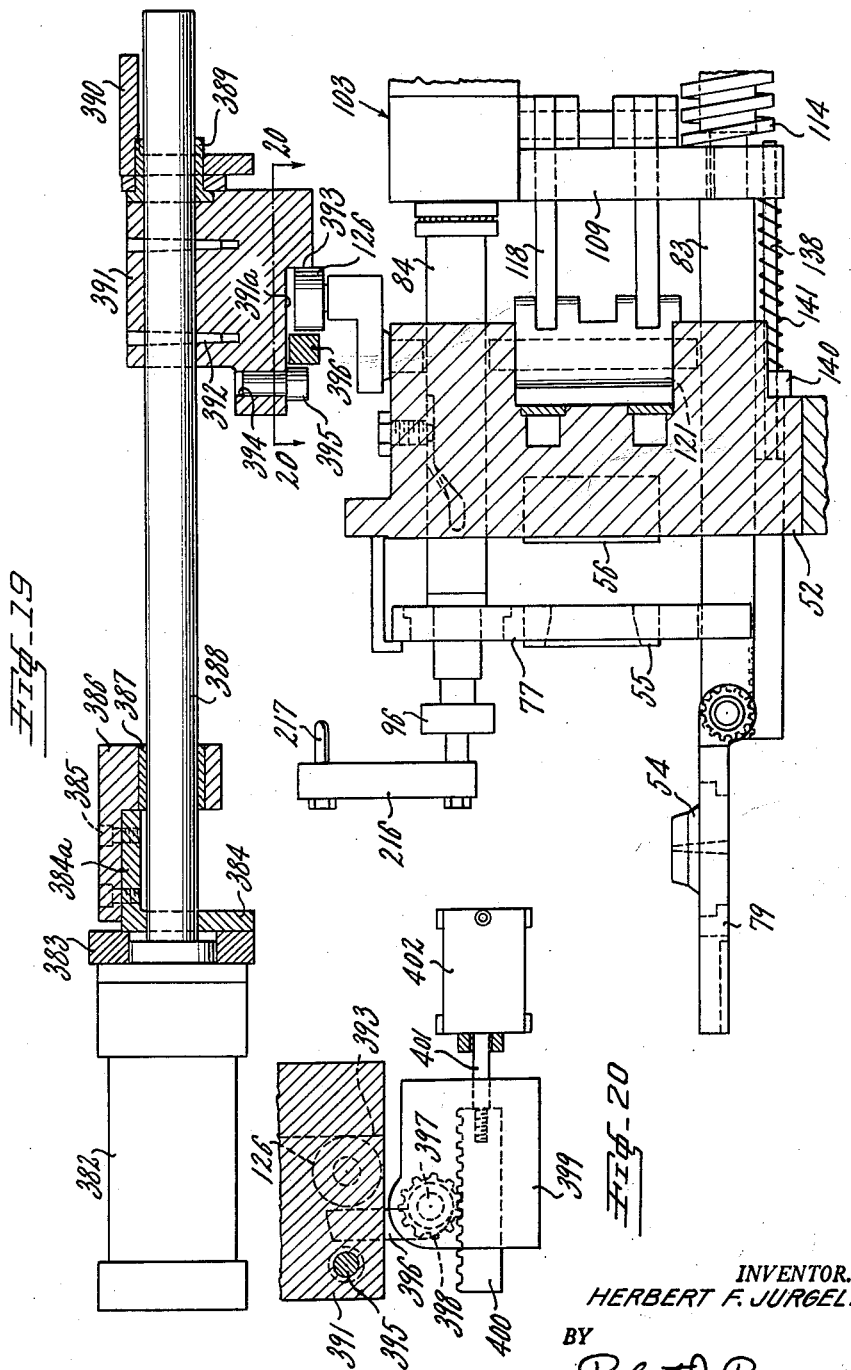

United States Patent Office
3,070,843
Patented Jan. 1, 1963

3,070,843
INJECTION MOLDING MACHINE
Herbert F. Jurgeleit, Oceanside, N.Y., assignor to United States Rubber Company, New York, N.Y., a corporation of New Jersey
Filed Aug. 6, 1959, Ser. No. 832,042
25 Claims. (Cl. 18—20)

This invention relates to automatic molding machines, and in particular to an automatic, duplex, rotary turret injection molding machine.

Injection molding operations as presently carried out by means of known molding machines or in accordance with known processes are generally beset by a number of difficulties and entail large expenditures of time and labor by constantly required operators and supervisory personnel. One of the operational difficulties invariably encountered is the formation of flash between insufficiently clamped mold plates during the curing of the injected molding compound resulting from the thermal expansion of the latter. The basic reason for this drawback of known machines and processes is that it has heretofore been deemed technically impracticable and thus uneconomical to provide means for exerting the necessary clamping pressures during the curing stage so as to ensure a flashless operation. A further operational difficulty generally encountered is the occurrence of molding scrap losses, especially in molding operations of the "bottomless cylinder" type. As is well known, in such operations the injection piston or plunger engages a mass of a molding compound, which is located in a substantially bottomless cylindrical cavity, and forces this compound against the sprue plate of a mold. In this manner, although a great amount of the compound is forced through the sprues of the sprue plate into the mold cavity or cavities, there always remains a sheet or "blanket" of the compound between the piston and the sprue plate at the end of the injection stroke of the former. This blanket of molding compound represents a complete waste and, since it is usually cured with the injected material, cannot be recovered for use during a subsequent injection operation.

Moreover, the known molding processes (automatic, semi-automatic and non-automatic) based on the injection, cavity-stuffing or compression molding principles are characterized by a number of serious drawbacks, including not only the above-mentioned high molding scrap losses and flash formation, but also high molding labor and supervision expenses, high costs of trimming, finishing and inspecting the molded articles, high mold maintenance costs, etc.

Still further, known rotary turret injection or compression molding machines are generally equipped with only one turret and one set of molds, whereby it is not feasible to increase production rate and efficiency for each machine beyond a certain limit. Thus, mass production techniques, especially for small items in great demand, require the use of a great number of molding machines each with its own set of controls and associated mechanisms, which means a considerable waste of floor space and naturally entails the expenditure of much needless time, labor and money.

It is, therefore, one of the important objects of the present invention to provide an automatic injection molding machine which is free of the drawbacks and disadvantages inherent in known injection molding machines and yet offers all the combined advantages of such known machines.

It is another important object of the present invention to provide an automatic molding machine in which the injection operation is effected by a modified "bottomless cylinder" arrangement without the usually encountered scrap losses of molding compound.

Another object of the present invention is the provision of such a molding machine in which the molds are of the multi-plate type and are so constructed and arranged that the various plates of each mold can be clamped together either resiliently or hydraulically with sufficient force to prevent any formation of flash between the plates without rendering the production of molded parts uneconomical.

Still another object of the invention is the provision, in a molding machine of this type, of means for preventing the occurrence of "backrinding" or other defects in the molded articles, and also of novel means for ejecting or extracting the molded articles from the molds simultaneously with a clearing of the sprues thereof.

A further object of the present invention is the provision of a compact duplex injection molding machine which is possessed of great versatility in the types of mold parts it can accommodate and in the shapes and sizes of articles which can be produced thereby, and which leads to considerable operating and manufacturing economies.

It is also an object of the present invention to provide novel and highly efficacious means for feeding the molding compound or stock to the injection units of an injection molding machine as aforesaid in accordance with the consumption of the stock, as well as to provide means for isolating the injection units from the rotary turrets at all times except during an actual injection operation.

Yet another important object of the present invention is the provision of multi-plate mold constructions and either cam-actuated or hydraulically actuated means for opening and closing the molds which render the mold plates substantially free of uneven wear at the contact surfaces thereof and thus greatly enhance the useful life of each mold.

The foregoing and other objects, characteristics and advantages of the present invention will be more fully understood from the following detailed description thereof when read in conjunction with the accompanying drawings, in which:

FIG. 1 is a vertical front elevational view of an injection molding machine constructed in accordance with the present invention;

FIG. 2 is a vertical sectional view taken along the line 2—2 in FIG. 1 and illustrates details of the structure of the mold wheel or turret arrangement, the three-plate molds carried by the wheels, the mold wheel indexing mechanism, and the stock feeding and injection means, some of the parts being shown in elevation;

FIG. 3 is a longitudinal sectional view of the mold opening and closing means associated with spring type mold clamping means, the anti-backrinding means, and the injection unit associated with one of the mold wheels or turrets of the machine;

FIG. 4 is a partly sectional and enlarged elevational view of the mold opening and closing means in conjunction with the means for preventing backrinding of the molding compound or stock during a curing operation, the means for extracting a molded article from a mold, and the means for clearing the sprue in the sprue plate of the mold;

FIG. 5 is a sectional view taken along the line 5—5 in FIG. 4 with the article extracting means removed;

FIG. 6 is a sectional view taken along the line 6—6 in FIG. 4;

FIG. 7 is a sectional view taken along the line 7—7 in FIG. 3;

FIG. 8 is an end elevational view, taken from the right-hand side of FIG. 7, of the rack and pinion mechanism for the anti-backrinding means and shows this mechanism in the operative position of the anti-backrinding means;

FIG. 9 is a sectional view taken along the line 9—9 in FIG. 3;

FIG. 10 is a fragmentary sectional view taken along the line 10—10 in FIG. 7;

FIG. 11 is a sectional, enlarged detail view of a two-plate mold which may be incorporated in the machine according to the invention;

FIG. 12 is a fragmentary, partly sectional top plan view of a clutch mechanism for disconnecting either of the mold wheels from the drive means therefor;

FIG. 13 is a partly sectional side elevational view of the clutch mechanism shown in FIG. 12;

FIG. 14 is a sectional view taken along the line 14—14 in FIG. 12 and illustrates an arrangement for heating the molds by means of steam or other fluid;

FIG. 15 is a sectional view similar to FIG. 14 and illustrates a slip ring and brush form of electric mold heating arrangement;

FIG. 16 is a view taken along the line 16—16 in FIG. 15;

FIG. 17 is a partly sectional elevational view of a modified form of the mold opening and closing means associated with hydraulic mold clamping means;

FIGS. 18 and 19 are partly sectional elevational views of a modified actuating arrangement for the mold opening and closing means; and FIG. 20 is a fragmentary sectional view taken along the line 20—20 in FIG. 19.

*General Organization*

Referring first to the drawings in general, it will be seen that the duplex molding machine according to the present invention comprises a frame A, a dual turret or mold wheel arrangement B including two sets of multi-plate molds, mold opening and closing means C, molding compound feeding and injecting means D, anti-backrinding means E, mold wheel indexing means F, means G for extracting the cured articles from the molds, and sprue clearing means H. All of the means B to H are supported on the frame A of the machine and cooperate through the intermediary of suitable control means to carry out completely automatically the various operations for each molding cycle for each mold carried by the mold wheels. The structural characteristics of the respective parts of the machine will now be described in greater detail.

*The Frame*

Referring now to FIGS. 1, 2 and 13, it will be seen that the frame A of the automatic molding machine comprises four stanchions or base members 20 mounted on any rigid surface 21, such as the floor of a factory building or room, through the intermediary of a plurality of base plates 22 welded or otherwise rigidly affixed to the lowermost ends of the respective stanchions. Each stanchion 20 is preferably of welded construction and substantially T-shaped in cross-section, with the center web 20a of each stanchion facing inwardly of the frame A. The stanchions 20 are arranged at the front and rear of the machine by pairs and in laterally downwardly diverging planes, and the corresponding oppositely located diverging stanchions are interconnected intermediate their ends by horizontal transverse struts 23 welded thereto at the opposite faces of the welded center webs 20a of the stanchions.

Rigidly affixed to the upper ends of the respective pairs of diverging stanchions 20, as by being welded thereto, are two cross members 24 to which are secured, as by bolts 25, respective journals 26 and 27 for rotatably supporting the mold wheel arrangement B (still to be described). Two vertical welded brackets or frame members 28, to the uppermost horizontal portions 28a of which are secured, respectively, the mounting or base plates 28′ for the two injection units associated with the two mold wheels, are welded to the opposite ends of each of the cross members 24.

In addition, four brackets or angle members 29 are welded, respectively, to the outer faces of the stanchions 20 intermediate the ends of the latter, these brackets constituting the mounting and supporting means for a pair of substantially annular stationary shields or housings 30 the purpose of which will be more fully explained hereinafter. As can be seen from FIGS. 1 and 2, the front housing or shield 30 comprises a vertically extending annular plate 31 which is cut away at its uppermost sector, thus being provided with radially extending edges 32—32, and provided at its inner periphery with a horizontally extending flange 31a, and a horizontally extending substantially annular plate 33 which is welded to the vertical plate 31 adjacent the outermost periphery thereof (see FIG. 2) and is provided adjacent its own outer periphery and on its inner surface with a groove or channel 34. The plate 33 is coextensive with the plate 31 and thus terminates in respective edge planes coinciding with the edges 32—32 of the plate 31. The rear shield or housing 30, being identical with the front one, is not explicitly illustrated or described herein.

Rigidly attached to and extending upwardly from the two injection unit mounting platforms 28′ (only one of which is shown) are two vertical frame members 35 the uppermost ends of which are connected by a horizontal cross member 36. Depending from the cross member 36 are two brackets or plates 37 to which are attached a pair of arcuate horizontally extending brackets 38 defining, respectively, a pair of downwardly facing grooves or channels 39. The location of the channel brackets 38 is such that the channels 39 thereof are aligned with the channels 34 provided in the horizontally extending plates 33 of the shields or housings 30, to thereby form a substantially continuous groove or channel. Each groove or channel 34—39 is substantially constant over its entire length except at one location near the top of the machine where it deviates from its normal path, as shown at 39a in FIG. 5, along a cam element 38a rigidly attached to the associated brackets 37 and 38, for a purpose to be more fully described hereinafter.

Provided in the interior of the vertical front shield plate 31 are two substantially annular, concentrically arranged channels or conduits 40 and 41 which communicate with one another adjacent one of the edges 32 of the plate 31 via a short, radially extending bore 42 and which are in communication at their other ends with a pair of conduits 43 and 44, respectively, serving as the inlet and outlet lines for any suitable fluid heating medium, such as steam. The same arrangement is, of course, provided in the rear shield plate 31 (not shown).

*The Mold Wheel Arrangement*

Rotatably supported by the journals 26 and 27 and extending centrally through the machine is a hollow shaft 45 which carries at spaced locations intermediate its ends a pair of mold wheels 46 and 47. As clearly shown in FIGS. 1 and 2, the mold wheel 46 comprises a hub 48 connected to the shaft 45 by means of a key 49 and having welded thereto at respective locations spaced 90° from one another circumferentially of the hub a plurality of radially extending arms 50 the outermost ends of which are connected to one another by a peripheral flange 51. A plurality of ribs 50a are welded to the hub 48 and the inner faces of the arms 50 so as to provide extra bracing for the latter, thereby to enhance the strength and rigidity of the mold wheel 46. The mold wheel 47 is in all respects identical with the mold wheel 46, comprising a hub 48′, a key 49′ by means of which it is connected to the shaft 45, arms 50′ and a peripheral flange 51′.

The mold wheel 46 carries at its outer periphery a mold ring 52 which is rigidly attached to the flange 51 and thus constitutes an integral part of the mold wheel. The mold ring 52 is provided, at that surface thereof which faces frontwardly of the machine, with a plurality of mold-retaining recesses 53 in each of which the bottom element of a multi-plate mold, presently to be described, is adapted to be seated.

As most clearly shown in FIGS. 2, 3 and 4, according to this embodiment of the invention each mold is composed of three mold elements 54, 55 and 56, of which the element 54 constitutes the sprue or top member of the mold, the element 55 the cavity member into which the molding compound is injected, and the element 56 the back-up or bottom member of the mold. It will be understood that the terms "top" and "bottom" are employed herein in their conventional senses (despite the fact that the mold wheel rotates in a vertical plane) to designate the mold elements or members which, respectively, serve to admit the molding compound into the mold cavity and to close that end of the mold cavity opposite to the point of entry of the molding compound. In a manner which will be more fully explained hereinafter in connection with the description of the mold opening and closing means C, the mold elements 54 and 55 of each mold are arranged for linear parallel movement toward and away from the associated mold element 56, each top mold element 54 being additionally arranged for angular movement relative to its associated mold cavity member 55.

The mold ring 52 is further provided, on that surface thereof which faces inwardly (rearwardly) of the machine with a pair of substantially concentric channels or conduits 57 and 58 extending circumferentially over the mold ring at respective radial locations opposite and corresponding to the radially innermost and outermost edges of the mold-retaining recesses 53. Fixedly carried by and extending axially through the mold wheel-supporting and driving shaft 45 for rotation therewith is a steam inlet pipe 59 the outer end of which is connected to a rotary coupling 60 stationarily arranged on the machine frame and adapted to be connected to a source of high pressure steam (not shown). The inner end of the inlet pipe 59 is connected to a pipe section 61 extending radially from the shaft 45 and connected in turn via a perpendicular pipe section 62 to a small pipe fitting 63 affixed to and extending through a bore in the mold wheel flange 51 into communication with a relatively short radial passageway 64 formed in the mold ring 52. The passageway 64 communicates at its other end with one end of the radially inner steam channel 57. The other end of the channel 57 (which may be located adjacent the aforesaid one end thereof) communicates via another short radial passageway (in a manner similar to the communication established by the passageway 42 between the the steam channels 40 and 41 of the shield 30) with one end of the radially outer channel or conduit 58 the other end of which communicates via a radial passageway 65 and another pipe fitting 65a extending through the mold wheel flange 51 with a pipe 66 affixed thereto at one end and extending in a direction substantially parallel to the axis of the shaft 45 to the mold wheel flange 51' of the other mold wheel 47.

The mold wheel 47 carries on its flange 51' a mold ring 52' identical in all respects with the mold ring 52 of the mold wheel 46, and thus neither the mold-retaining recesses nor the steam conduits thereof corresponding to the recesses 53 and conduits 57—58 of the mold ring 52 are explicitly described or illustrated herein. The pipe 66, therefore, communicates at its other end with one of the circumferential steam channels in the mold ring 52', which steam channel communicates with the other steam channel which in turn communicates with a short pipe section 67 connected to the mold wheel flange 51'. The pipe section 67 is connected via a pipe section 68 extending parallel to the shaft 45, and via a pipe section 69 extending radially of and into the shaft, with a steam outlet pipe 70 fixedly carried by and extending axially through the shaft 45 at the end thereof supported by the journal 27 (not shown in FIG. 2 but indicated in FIG. 13). The outermost end of the pipe 70 is connected via a rotary coupling (not shown) similar to the coupling 60 to a steam exhaust line (not shown).

From the foregoing it will be understood that steam under high pressure may be admitted through the coupling 60 into the inlet pipe 59 and thence into the channels 57 and 58 of the mold rings 52 and 52' even during rotation of the shaft 45 and the mold wheels 46 and 47, for the purpose of heating the respective sets of molds carried thereby. The steam, after coursing through both the mold rings, leaves the mold ring 52' and is exhausted in any suitable manner via the outlet conduit 70 for disposal or recycling, as desired.

Referring now particularly to FIGS. 3 and 4, it will be seen that the mold ring 52 is further provided at its radially outermost edge and on the side facing frontwardly of the machine frame A with a peripheral ridge or flange 71 which extends radially from the ring to an extent sufficient to permit engagement thereof with the associated downwardly depending bracket 37 affixed to the cross member 36 of the frame members 35. As will presently become clear, the function of the flange 71 when in engagement with the bracket 37 is to provide means for taking up the lateral forces exerted on the mold ring by the injection unit of the molding compound feeding and injecting means D during an injection operation.

The mold ring 52 is further provided at a plurality of locations, corresponding in number to the number of mold-retaining recesses 53, with horizontally extending brackets 72 welded, for example, to the outer face of the flange or ridge 71 and provided at their free ends with respective fingers or lugs 73 extending radially inwardly of the mold wheel 46. The mold ring 52 is still further provided, adjacent each recess 53 and at locations diagonally opposite the brackets 72, with similar brackets 74 at the free ends of which are arranged fingers or lugs 75 (see FIG. 5) extending radially outwardly of the mold wheel 46. The function of these brackets 72—73 and 74—75 will be more fully explained hereinafter in connection with the description of the mold opening and closing means C.

In a similar manner, as clearly shown in FIG. 2, the mold ring 52' is provided with a peripheral ridge or flange 71', with a plurality of brackets 72'—73' and with a plurality of other brackets (not shown) diagonally opposed to these, which structural elements perform the same functions as the ridge or flange 71 and the brackets 72—73 and 74—75 on the mold ring 52.

*The Mold Opening and Closing Means*

Referring again to FIGS. 3 and 4, it will be remembered that the recesses 53 in the mold ring 52 (and also in the mold ring 52') were identified hereinbefore as "mold-retaining" recesses. Strictly speaking, however, this designation is only partly accurate inasmuch as only the bottom elements 56 of the various molds are seated and retained in the respective recesses 53. The intermediate or cavity elements 55 of the various molds are mounted and retained in respective bores or openings 76 of a plurality of carrier plates 77 arranged in side by side relationship and spaced from one another circumferentially of the associated mold rings, while the top or sprue elements 54 of the various molds are mounted and retained in respective shouldered bores 78 of a plurality of carrier plates 79 also arranged in side by side relationship and spaced from one another circumferentially of the associated mold rings. For a purpose which will presently become apparent, the bottom mold elements 56 are sufficiently large to project slightly out of their recesses 53, while the cavity elements 55 are sufficiently large to project slightly out of their recesses 76.

As hereinbefore indicated, each of the mold rings 52 and 52' is provided with a great number of recesses 53, for example forty in number, to accommodate an equal number of molds, which permits attainment of much greater production rates than has been possible heretofore. For the sake of clarity, only a few of these molds are shown in FIG. 1. Moreover, each of the molds has associated therewith an individual mold opening and closing arrangement, all of which are identical in all respects. For the purpose of a description of the mold opening and closing means C, therefore, only one arrangement thereof in association with a single mold associated with the mold wheel 46 and the mold ring 52 thereof will be specifically described at this time.

Turning now to FIGS. 3 to 6, it will be seen that the intermediate mold carrier plate 77, into which the cavity element or insert 55 has been fitted, is provided in its lowermost (radially innermost) edge with a rectangular recess 80 and in its uppermost (radially outermost) edge region with a shouldered bore or opening 81 in which is retained a split bushing 82. The recess 80 and the bushing 82 are adapted to accommodate correspondingly shaped portions of a pair of operating rods 83 and 84, respectively, both of which are disposed at right angles to the plane of the carrier plate 77 and extend slidably through a pair of bores 85 and 86 provided in the mold ring 52 at radially spaced locations adjacent the innermost and outermost edges of the mold-retaining recess 53, the bores 85 and 86 extending from the front face of the mold ring 52 through a pair of projections 87 and 88 integral with the mold ring and facing inwardly of the machine frame A (to the right in FIGS. 3 and 4).

As clearly shown in FIG. 6, the front end 83a of the mold operating rod 83 is milled flat on its opposite sides, thereby providing a pair of shoulders 83b on the rod 83 adapted to engage the rear surface of the intermediate carrier plate 77 at the opposite sides of the recess 80 thereof. The flattened rod portion 83a extends forwardly from the shoulders 83a of the rod 83 to a point beyond the front surface of the carrier plate 77 and is provided adjacent its foremost end with a transverse bore 83c.

Referring to FIG. 3 in particular, it will be seen that the second mold operating rod 84 is shaped in the form of a hollow tube the opposite ends of which are internally threaded, as shown at 89 and 90, respectively. Screwed into the end 89 is a substantially tubular fitting or sleeve element 91 provided with an annular shoulder-forming flange 92 intermediate its ends, the portion 93 of the element 91 located exteriorly of the tube 84 being dimensioned to be slidably received in the split bushing 82 mounted in the bore 81 of the intermediate carrier plate 77. The axial length of the section 93 of the element 91 is greater than the axial thickness of the bushing 82. The element or fitting 91 is further provided at the front end of the section 93 thereof with a section 94 of reduced diameter, thereby forming an annular shoulder 95 facing forwardly (outwardly) of the machine frame A. At its front end, the fitting section 94 is provided with an enlarged, elongated head 96 which is milled flat on its opposite longer faces. The entire fitting 91, including all of the sections and the head thereof, is provided with an axial bore 91a the function of which is to provide a passageway for an element still to be described and constituting a part of the anti-backrinding means E.

In contradistinction to the first mold operating rod 83, which is adapted to execute only linear reciprocal sliding movement through the bore 85 in the mold ring 52, the rod 84 is required to perform both linear and angular or rotary reciprocal movements within the bore 86 of the mold ring. To this end (FIG. 4), there is provided in the rod or tube 84 intermediate the ends thereof a double-faced or sided cam groove 97 into which extends a small projection 92a of a guide screw or bolt 98 fixedly positioned on the mold ring 52. The cam groove 97 is provided with linear end sections and an angled or curved center section, whereby the rod 84 will be rotated while being moved axially through the bore 86, but only for a preselected portion of this axial movement.

Screwed into the end 90 of the rod or tube 84 (FIG. 3) is a second substantially tubular fitting or sleeve element 99 provided intermediate its ends with a shoulder-forming annular flange 100 from which extends a section 101, the latter in turn being connected with a section 102 of reduced diameter which is externally threaded at its outermost end, as shown at 102a. Slidably mounted on the outermost end of the intermediate fitting section 101 is a multi-section housing 103 the sections 103a and 103b of which define an inner chamber 104, and the section 103c of which constitutes a part of the anti-backrinding means E. The housing sections are secured to one another by bolts 103d (see FIG. 7). As shown in FIG. 3, the fitting section 102 is disposed entirely within the chamber 104, while the fitting section 101 extends through a bore 103e at one end of the housing. Surrounding the section 101 exteriorly of the housing 103 and intermediate the latter and the shoulder-forming flange 100 is a thrust bearing 105 the axial dimension of which is such that there is normally a slight clearance between the front face of the bearing and the rear face or shoulder of the flange 100. The importance of this feature of the invention will be more fully explained hereinafter.

Fixedly mounted on the fitting section 102 within the housing 103 is a cylindrical sleeve 106 which is provided with an outer annular flange 106a at one end and is internally threaded at the same end so as to enable it to be screwed onto the threaded end 102a of the fitting section 102. Surrounding the sleeve and abutting at one face against the flange 106a is a thrust bearing 107 the other face of which is engaged by one end of an extremely strong spring 108, capable of exerting a thrust of about 2,000 pounds, the other end of which abuts against the end wall of the housing 103 about the bore 103e. A nut 106b screwed onto the end of the fitting section 102 locks the sleeve 106 in position. As in the case of the fitting 91, the fitting 99 is provided with an axial bore 99a adapted to accommodate the aforesaid and still to be described element of the anti-backrinding mechanism E.

The housing section 103a is provided with a downwardly depending portion or yoke 109 provided with a transverse bore 110. The first mold operating rod 83 is provided with a portion 83d of reduced diameter extending from the rear or innermost end of the rod 83. The rod portion 83d extends slidably through the bore 110 and is constrained to linear reciprocal movement therein by a key and groove arrangement 111. The rod portion 83d is externally threaded adjacent its outermost end and carries a sleeve 112 provided with an annular flange 113, a compression spring 114 surrounding the sleeve 112 and being interposed between the flange 113 and the opposite face of the depending yoke 109. The sleeve is retained in position on the rod portion 83d by any suitable lock nut or washer structure 115.

The yoke 109 is provided with a pair of projections 116 in which is retained a pivot pin 117 the axis of which extends at right angles to the axes of the mold operating rods 83 and 84. Connected to the pivot pin 117 at axially spaced locations thereon are two toggle links or arms 118 which are connected at their other ends to a pivot pin 119 retained in a pair of projections 120 of a toggle 121, the latter in turn being mounted for angular movement about a pivot pin 122 mounted in the projections 87 and 88 of the mold ring 52. Extending upwardly from the toggle 121 is an arm 123 the outermost end of which is connected to one end of a bell crank lever 124. The bell crank lever 124 is pivotally mounted on the mold ring projection 88 by means of a pivot bolt 125 disposed coaxially with the pivot pin 122 of the toggle 121. At its other end, the bell crank lever 124 carries a cam or follower roller 126, and the arrangement is such that the roller 126 is adapted to extend into and ride along the channel 34—39 defined by the horizontally extending portion 33 of the front mold wheel shield 30 and the horizontally extending bracket 38 affixed to the frame A through the intermediary of the vertical bracket 37.

Referring now particularly to FIGS. 5 and 6, it will be seen that the mold carrier plate 79, in the shouldered recess 78 of which the top or sprue element 54 of the mold is mounted, is provided at one end with a pair of spaced, parallel projections 127 and 128 in which are formed respective transverse bores 127a and 128a. The flattened end portion 83a of the rod 83 extends into the space between the arms 127 and 128, the bore 83c of the rod portion 83a being axially aligned with the bores 127a and 128a. Rotatably arranged within the bore 83c of the mold operating rod portion 83a is a cross pin 129 one end of which extends through the bore 127a and the other end of which extends through the bore 128a. Fixedly connected to the cross pin 129 at the end thereof projecting from the bore 127a is a pinion or spur gear 130. The other end of the cross pin 129 is connected to the plate 79 by means of a key and groove arrangement 131 within the confines of the bore 128a, so as to inhibit relative rotation between the plate and the cross pin. The latter may, in addition, be fixedly retained within the bores 127a—128a by means of any suitable lock washer or nut means 132.

The carrier plate 79, adjacent the end thereof remote from the arms 127 and 128, is provided with a rectangular slot or cut-out 133 extending longitudinally of the plate and substantially centrally thereof, the innermost end of the slot 133 being disposed somewhat short of the peripheral boundary of the mold element-holding recess 78. The face of the plate 79 which in the closed position of the mold is directed away from the mold ring 52 and the intermediate carrier plate 77 is further provided with a milled out circular recess 134. The width of the slot 133 is such as to permit easy passage of the mold operating rod head 96 therethrough when the longitudinal dimension of the latter is disposed parallel to the longitudinal dimension of the slot, and the diameter of the recess 134 is such as to permit rotation of the head 96 therein. The purpose and function of this arrangement will become clear presently.

The mold ring 52 is further provided with a bore 135 disposed laterally of the bore 85 and parallel to the latter, the bore 135 extending from the front face of the mold ring to the rear face thereof. Slidably arranged within the bore 135 is a bar 136 one of the ends of which extends forwardly from the mold ring and is provided with teeth 137 defining a rack, the teeth 137 meshing with the teeth of the gear or pinion 130. Rigidly connected at one end to the other end of the bar 136 and projecting from the latter rearwardly of the mold ring is a pusher rod 138 the other end of which extends slidably into and through a bore 139 provided in the lowermost end region of the yoke 109 (see also FIGS. 3 and 4). Fixedly mounted on the pusher rod 138 intermediate the ends thereof is a stop member 140 (the stop member may, of course, be adjustably fixed on the pusher rod). Surrounding the pusher rod between one face of the stop member 140 and the adjacent face of the yoke 109 is arranged a compression spring 141.

The operation of the mold opening and closing means C will thus be seen to be as follows:

When, as illustrated in FIG. 3, both the rods 83 and 84 are in their most retracted positions, as a result of the corresponding positioning of the yoke 109 and toggle 121 under the influence of the cam roller 126 which is located at an undeflected portion of the cam track or channel 39 spaced from the deflecting portion 39a thereof, the head 96 of the mold operating rod 84 is disposed at the forward face of the top carrier plate 79 and oriented crosswise to the slot 133. The spring 108 in the housing 103 thus exerts a powerful pull on the rod 84 due to the provision of the slight clearance between the shoulder 100 and the thrust bearing 105, which pull is transmitted by the rod 84 and the head 96 thereof to the top carrier plate 79 adjacent one edge of the latter. Concurrently with the foregoing, the spring 114 exerts a similar pull on the mold operating rod 83 and, through the same and the cross pin 129, on the other edge of the top carrier plate 79, whereby the latter is drawn uniformly toward the intermediate carrier plate 77. Inasmuch as the base or bottom mold insert 56 is shaped so as to project slightly beyond the confines of the recess 53 in the mold ring 52, while the cavity insert 55 is shaped to project slightly beyond the confines of the carrier plate 77, there is provided a slight clearance between the adjacent surfaces of the mold ring 52 and the intermediate carrier plate 77, as well as between the adjacent surfaces of the intermediate and top carrier plates 77 and 79. Consequently, a thorough and uniform clamping of the mold lands against one another is affected in such a manner as will tend to substantially inhibit the formation of flash therebetween.

At this point, with the mold operating rod head 96 turned crosswise of the slot 133, the guide bolt 98 is located in the forwardmost linear end section of the cam slot 97, which portion of the latter extends parallel to the axis of the mold operating rod 84. For the purpose of opening the mold, the cam roller 126 reaches the offset portion 39a of the cam track or channel 39, whereupon the bell crank lever 124 is pivoted about its axis 125 in such a manner as to swing the toggle 121 about the pivot pin 122 thereof in the direction required to cause the yoke 109 to be pulled forwardly, i.e., from right to left as seen in FIG. 3. Accordingly, the rod 83 will be moved to the left due to the engagement between the yoke 109 and the shoulder formed between the main portion of this rod and the reduced diameter portion 83d thereof, while at the same time the rod 84 will be moved to the left through the intermediary of the housing 103 and the thrust bearing 105, the latter of which now bears against the shoulder-forming flange 100 of the element 99 affixed to the rod 84.

During the initial part of this movement of the rods 83 and 84, the projection 98a of the guide bolt 98 rides along the aforesaid relatively short forwardmost linear end section of the cam groove 97. Thus, the rod 84 is moved linearly only for a short distance and is not rotated about its axis and, consequently, the radially outermost end region of the top carrier plate 79 is moved away from the intermediate carrier plate 77 with a straight, parallel motion through the intermediary of the shoulder 95 formed on the element 91 affixed to the rod 84. At the same time, the movement of the yoke 109 is transmitted through the spring 141 and the stop 140 to the pusher rod 138 and thence to the rack bar 136, the latter thereby being moved jointly with the rod 83. Accordingly, there is no relative movement between the rack bar 136 and the pinion 130, as a result of which the other or radially innermost edge of the top carrier plate 79 is also moved away from the intermediate carrier plate 77 with a straight, parallel motion. Viewed as a unit, therefore, the top carrier plate 79 is first moved parallel to the intermediate carrier plate 77 while the latter remains stationary.

After the rods 83 and 84 have been moved through a predetermined distance sufficient to extract the sprue element 54 completely from the confines of the cavity element 55, the shoulders 83b on the rod 83 contact the intermediate carrier plate 77, while the shoulder formed by the flange 92 of the fitting 91 engages the split bushing 82, it being understood, of course, that the shoulders 83b and 92 are located in the same vertical plane. The intermediate carrier plate is thus moved away from the mold ring 52 with a straight, parallel motion so as to separate the cavity element 55 (and, of course, any molded article retained therein) from the bottom mold element 56. The parallel motions of the top and intermediate carrier plates are important features of the present invention, since they bring about the highly desirable result of considerably prolonging the useful life of the mold by substantially eliminating uneven wear of the mold elements.

At this time, the projection 98a of the guide bolt 98 enters the angled or curved center section of the cam groove or slot 97 in the rod 84, as a result of which further axial movement of the latter is accompanied by a rotation thereof in such a manner as to bring the head 96 into alignment with the slot 133 in the top carrier plate 79. As soon as this has taken place, the stop 140 on the rack pusher rod 138 reaches the rear face of the mold ring 52 with the consequence that further forward movement of the rack bar 136 is arrested. It will, therefore, be readily understood that as forward movement of the rod 83 continues, the meshing of the teeth 137 of the rack bar 136 with the teeth of the pinion 130 causes the latter to be rotated in a counterclockwise direction as seen in FIG. 3, with the result that the cross pin 129 and therewith the top carrier plate 79 are likewise angularly moved to bring the latter into the horizontal position shown in FIGS. 4, 5 and 6, such angular movement of the plate 79 being permitted by virtue of the fact that the head 96 of the rod 84 was previously moved into alignment with the slot 133 and is now no longer being rotated due to the engagement of the guide bolt projection 98a with the rearwardmost linear portion of the cam groove 97. At this point, the intermediate carrier plate 77 is engaged by the fingers 73 and 75 of the stop brackets 72 and 74, respectively, and any further forward movement of the intermediate carrier plate is inhibited. It will be understood that the respective brackets and their associated lugs or fingers may be replaced by headed bolts, generally referred to by the term "stripper bolts," which extend slidably through suitable openings provided in the intermediate carrier plate of the molds. The purpose of this arrangement will be more fully described hereinafter in connection with the description of the article extracting or ejecting means G.

When the cam rollers 126 is returned to its normal position in an undeflected portion of the channel 39, the foregoing movements of the various carrier plates and their operating means are repeated in reverse. First, the toggle 121 is swung so as to move the yoke 109 to the right as seen in FIG. 3, which movement is transmitted to the mold operating rods 83 and 84 through the springs 114 and 108, respectively. At the beginning, of course, both the rods move linearly only, and since the spring 141 is still under compression, the mold operating rod 83 moves while the pusher rod 138 and rack bar 136 remain stationary. The pinion 130 is thus rotated in a clockwise direction as seen in FIG. 3, whereby the top carrier plate 79 is swung upwardly past the head 96 of the mold operating rod 84. Thereafter, as soon as the yoke 109 has moved sufficiently far to permit the stop 140 to be separated from the rear face of the mold ring 52, which takes place upon complete relaxation of the compression of the spring 141, relative movement between the pinion 130 and the rack bar 136—137 ceases so as to bring about straight, parallel movement of the carrier plate 79 toward the carrier plate 77 and subsequent straight, parallel movement of the latter toward the mold ring 52. Concurrently, the return movement of the guide bolt projection 98a along the curved center section of the cam groove or slot 97 causes the head 96 to be rotated back into its initial position crosswise of the slot 133. At the end, the springs 108 and 114 will again be operable to apply the needed clamping pressures to the various carrier plates and the mold elements thereof, due to the presence of the hereinbefore described slight clearance between the thrust bearing 105 and the shoulder-forming flange 100 of the fitting 99, this clearance simultaneously enabling the machine to compensate for normally encountered tolerance variations in the dimensions of the various mold inserts or elements.

*The Molding Compound Feeding and Injecting Means*

The machine according to the present invention is so constructed that molding compound is injected into each mold at only one station along the periphery of each mold wheel. Again, only one of the compound feeding and injecting arrangements will now be described in detail, inasmuch as the other one is in all respects identical therewith.

As previously set forth herein, the molding compound feeding and injecting means D is supported on a mounting or base plate 28' affixed to the uppermost horizontal portion 28a of the vertical frame member 28 at the space between the edges 32 of the mold wheel shield 30. Referring now in particular to FIGS. 1, 2, 3 and 9, it will be seen that a double-acting hydraulic motor cylinder 142 provided with pressure fluid lines 143 and 144 is rigidly mounted on the base plate 28', one cross-head 142a of the cylinder being secured, as by bolts or the like, to the frame member 35 affixed to the base plate 28'. Reciprocally arranged within the cylinder 142 is a piston (not shown) provided with a piston rod 145 projecting out of the cylinder through any suitable stuffing box 146 and inwardly of the machine frame A through an opening in the frame member 35, the front end of the piston rod 145 carrying an injection piston 147 which may be secured to the piston rod in any suitable manner, as by being screwed thereto through the intermediary of internal threads on the injection piston and corresponding external threads on the piston rod 145. The injection piston 147 extends into an injection cylinder 148 which is mounted for reciprocal axial sliding movement in and through an annular support 149 rigidly affixed to the mounting plate 28' by bolts 150.

The cylinder 148 is provided at that end thereof remote from the point of entry of the injection piston 147 with an annular inturned flange 148a the inner peripheral edge of which defines an opening 148b through which the molding compound is to be injected into the molds. Affixed to the injection cylinder 148 by means of screws or bolts 151 and extending across the opening 148b is a relatively thin, flexible, metallic plate 152 in which is provided an aperture 152a. The plate 152 thus constitutes a sprue plate for the injection cylinder, and its sprue opening 152a is so positioned as to register with the sprue in the top element 54 of the mold. Although only one sprue opening is shown, the number and distribution of such openings across the plate 152 will always correspond exactly to the number and distribution of the sprues in the top mold element 54. The plate 152 is flexible to enable the same to adapt itself to and to lie flush against the entire free face of the mold element 54 under the pressure applied to the molding compound in the injection cylinder 148 during the injection stroke of the piston 147, whereby the pressure will be evenly distributed over the area of the mold while any escape of molding compound between the sprue plate 152 and the mold element 54 will be prevented. In effect, therefore, even though the injection cylinder bottom is covered by the sprue plate 152, the injection operations carried out by the machine according to the present invention are still of the "bottomless cylinder" type, the advantages of which are well known, and the disadvantages of which are eliminated by the present invention.

At its other end, the cylinder 148 is provided with an annular outwardly directed flange 153 to which are affixed in any suitable manner and at a plurality of equi-angularly spaced peripheral locations, for example six in number, a plurality of headed shoulder bolts 154 and a plurality of guide pins 155 alternating with the shoulder bolts 154. As clearly shown in FIG. 3, the support 149 is provided with a plurality of recesses 149a into which the shoulder bolts 154 extend, the heads 154a of the shoulder bolts being engageable with the bottoms of the respective recesses 149a to limit the extent of sliding movement of the injection cylinder outwardly of the frame A during retraction of the cylinder from the mold. The support 149 is further provided with a plurality of recesses 149b, the guide pins 155 extending through the recesses 149b, respectively, and being surrounded by compressions springs 156 each bearing at one end against the injection cylinder flange 153 and at the other end against the bottom of the associated recess 149b. The function of the springs thus is to effect a retractive movement of the injection cylinder 148 through the support 149 to the extent permitted by the shoulder bolts 154.

Rigidly mounted on the base plate 28' intermediate the frame member 35 and the support 149 is a frame member 157 at the center of which is provided an upwardly concave portion 158 which defines an additional sliding support surface for the injection piston 147 and also a receiving or starting place for the molding compound to be injected into the mold by the piston 147. Positioned above the frame member 157 and terminating in a downwardly concave arcuate edge plane 159 is a feeding chute 160 of substantially rectangular cross-section defined by a front wall plate 160a, a rear wall plate 160b, and side wall plates 160c and 160d welded together at their respective edges and rigidly affixed to the cross member 36 interconnecting the members 35, preferably by means of a welded angle member 161. The chute 160 provides a path of movement for the molding compound into the starting position thereof in which it can be picked up by the injection piston, as more fully explained hereinafter.

Fixedly connected with the injection piston 147 and its piston rod 145 is a pin 162 which projects laterally from the injection piston into engagement with a first or actuating slide 163 arranged for linear reciprocal movement in a horizontal slideway 164 of the frame member 157, the slide 163 being provided with a recess 163a in which the head of the pin or screw 162 is received. The slide 163 is provided with an upwardly extending arm 165 at the uppermost end of which is pivotally supported by means of a pivot pin 165a a pawl or latch member 166 integral with a cam 167, a torsion spring 168 or the like being associated with the pivot pin 165a in such a manner as to bias the pawl downwardly (in a clockwise direction as seen in FIG. 3). The pawl 166, as can be seen from FIG. 9, is located adjacent the outer surface of the side wall plate 160c of the chute 160.

Reciprocally mounted in a suitable horizontal slideway or guide structure 169 affixed to and extending between the frame member 35 and the front wall plate 160a of the chute is a second slide 170 provided at that end thereof facing toward the chute with a pair of spaced, parallel fingers 171 and 172 and with a pair of side members 173 and 174 located adjacent and spaced from the remote side edges of the fingers 171 and 172, respectively. At a location aligned with the track or path of movement of the slide 170, as defined by the slideway 169, the front wall plate 160a of the chute is provided with a transverse opening adapted to permit entry of the fingers 171 and 172 into the chute. The fingers of the slide 170 are so spaced from one another as to be located immediately adjacent the respective inner surfaces of the side wall plates 160c and 160d of the chute when the slide is moved to position the fingers within the chute, and the spaces between the fingers 171 and 172 and their associated side members 173 and 174 are sufficiently wide to receive the side wall plates 160c and 160d, respectively, when the slide is moved into the position ilustrated in FIG. 3. The arrangement is such that the lowermost edge of the pawl 166 bears against the upper edge of the side member 173 of the slide 170 at all times under the force of the spring 168.

At its other end, the slide 170 is provided with a guide rod 175 extending toward the frame member 35 which is provided with a bore 176 adapted to receive the guide rod 175 when the slide 170 is moved so as to withdraw the fingers 171 and 172 from the chute 160. Interposed between the slide 170 and the frame member 35 and surrounding the guide rod 175 is a compression spring 177 the function of which is to bias the slide 170 toward the chute 160.

Pivotally mounted at one end by means of a pin 178 on a block 179 attached to the frame of the machine is a lever 180 the lower edge of which normally rests on the upper edge of the cam 167 connected with the pawl 166. The lever 180 is biased downwardly (in a counterclockwise direction as seen in FIG. 3) by a spring 181 bearing against the upper edge of the lever adjacent the free end thereof and mounted on the frame of the machine, a stop 182 being provided to limit upward movement of the lever against the force of the spring 181. The lever 180 is adapted to rock the cam 167 in a manner and for a purpose which will be more fully explained hereinafter.

Positioned above the slideway or guide structure 169 is a similarly constructed horizontal slideway or guide structure 183 one end of which is rigidly attached to the upright frame member 35 and the other end of which is attached to the front wall plate 160a of the chute 160, the front wall plate 160a being provided with a transverse opening 184 aligned with the space between the upper and lower members of the guide structure 183. Slidably disposed within the latter for reciprocal movement therealong is a third slide 185 which is provided at that end thereof facing the chute 160 with a pair of spaced parallel fingers 186 and 187 and with a pair of side members 188 and 189 spaced from and parallel to the remote sides of the fingers 186 and 187, respectively. The fingers 186 and 187 are adapted to enter the chute 160 through the opening 184 and are spaced from one another in such a manner as to be located closely adjacent the chute side wall plates 160c and 160d upon movement of the slide 185 toward the chute, the spaces between the fingers 186 and 187 and their associated side members 188 and 189 being sufficiently wide to accommodate the aforesaid chute side wall plates. For ease of reference, the slide 170 will hereinafter be referred to as the "lower" slide and the slide 185 as the "upper" slide.

Fixedly attached to a block 190a mounted on the machine frame laterally of and intermediate the guide structures 169 and 183 is a pivot bolt or like element 190 on which is rockably mounted a two-armed link or transmission lever 191. The lever 191 is articulated at its upper end by means of a pin 191a to the side member 189 of the upper slide 185, and at its lower end by means of a pin 191b to the side member 174 of the lower slide 170. The arrangement is such that when the lower side 170 is in its advanced position with the fingers 171 and 172 extending across the interior of the chute 160, the upper slide 185 is in its retracted position, and vice versa.

Referring in particular to FIGS. 1 and 2, it will be seen that the cross frame member 36 further supports a housing 192 comprising parallel, spaced front and rear wall plates 193 and 194 connected at their corresponding opposite edges by side wall plate (not shown). Rotatably journaled in the housing plates 193 and 194 is an axle or shaft 195 one end of which projects from the housing 192 through the rear wall plate 194 thereof. Fixedly mounted on the shaft 195 immediately adjacent the outer surface of the rear wall plate 194 is a ratchet wheel 196 the teeth of which face in a clockwise direction as seen in FIG. 1. Loosely mounted on the shaft 195 adjacent the outer surface of the ratchet wheel 196 is a two-armed or bell crank lever 197 one arm of which carries, by means of a pivot pin 198 located at one end thereof, a dog or pawl member 199 facing in a counterclockwise direction, as seen in FIG. 1, suitable biasing means (not shown) being provided on the lever 197 or the pivot pin 198 to continually urge the pawl 199 into engagement with the outer surface of the ratchet wheel 196.

Fixedly mounted atop the housing 192 is a cylinder 200 of a double-acting pneumatic motor, the cylinder 200 being provided with pressure fluid lines 200a and 200b and with a piston (not shown) reciprocal in the cylinder. Connected to this piston and projecting downwardly therefrom through an opening 192a in the top of the housing 192 is a piston rod 201 to the lowermost end of which is connected a shearing blade or cutting member 202 which fits slidably into the space between the front and rear wall plates 193 and 194 of the housing 192. Also connected to the piston rod 201 above the blade 202 and extending out of the housing 192 through a suitable recess provided in the rear wall plate 194 is a transverse arm 203 to the outermost end of which is articulated one end of a link 204, the other end of the link 204 being articulated to the free end of the second arm of the bell crank lever 197. The shaft 195 further supports, at a location intermediate the front and rear wall plates 193 and 194 of the housing 192, a wheel member 205 provided in its periphery with a plurality of equi-angularly spaced pockets or recesses 206 each adapted to receive a quantity of the molding compound from a source of the latter, as will be described shortly. The wheel 205 will hereinafter be referred to as a transfer or feeding wheel for the molding compound, and the arrangement is such that in any given position of the transfer wheel 205 one pocket 206 thereof, to wit the uppermost one, is in vertical alignment and communication with the interior of the housing 192 defining the path of movement of the blade 202, while the pocket 206 located diametrically opposite to the first-named pocket is in vertical alignment and communication with the uppermost or inlet end of the chute 160.

Rigidly attached to the front wall plate 193 of the housing 192 and extending forwardly of the machine frame A is a horizontal platform or bracket 207 on which is rigidly mounted a cylinder 208 of a double-acting pneumatic motor, the cylinder 208 being provided with pressure fluid lines 208a and 208b and with a piston (not shown) from which extends a piston rod 209. The piston rod carries at its free end a frame 210 which is provided with an aperature 211 adapted to define a passageway for the molding compound 212 which may, for example, be shaped in the form of a cylindrical rod adapted to be fed longitudinally from a rotating table (not shown) where it is initially placed in coil form. Rockably mounted on the frame 210 is a plurality of gripping elements 213 each of which is biased in the direction of the axis of the aperture 211 by a leaf spring or like element 214, each of the gripping elements 213 being preferably provided with at least one sharp edge capable of penetrating the surface of the rod of molding compound 212. In alignment with the aperature 211, there is provided in the front wall plate 193 of the housing 192 an aperature 193a, whereby the rod 212 of molding compound can enter into the housing 192. As will be readily understood from FIGS. 2, 3 and 9, that portion of the molding compound or stock 212 which is within the housing 192 is in position to be sheared off from the remainder of the stock into biscuit-shaped slices or pieces 212a, 212b, 212c, 212d, etc. by the blade or cutting element 202 upon lowering of the latter.

The operation of the molding compound feeding and injecting means D will be readily apparent from the foregoing and may be briefly summarized as follows:

When the piston of the stock feed motor cylinder 208 is advanced upon admission of pressure fluid through the line 208b, after a portion of the molding compound rod 212 has been inserted through the aperture 211, the sharp edges of the gripping member 213 are pressed into the peripheral surface of the rod 212 and thus entrain the latter into movement with the piston rod 209 until the leading end of the rod 212 is positioned within the confines of the housing 192 and against the inner surface of the rear wall plate 194 thereof. The shearing motor is then actuated by admission of pressure fluid into the cylinder 200 through the line 200b to advance the piston thereof and thus to lower the piston rod 201 and the blade or cutting element 202. When the lowermost edge of the blade contacts the portion of the molding compound rod 212 extending across the interior of the housing 192, said portion is sheared off from the remainder of the rod and dropped into the uppermost chamber or pocket 206 of the transfer wheel 205, the latter during this time remaining stationary due to the fact that the pawl 199 carried by the bell crank lever 196 which is freely rotatable on the shaft 195 merely slides over the outer or back faces of the teeth of the ratchet wheel 196.

The feed motor is now reversed by admission of pressure fluid into the cylinder 208 through the line 208a to retract the piston rod 209 and the frame 210, as a result of which the sharp edges of the gripping members 213 are drawn out of the rod 212 so as to permit sliding movement of the gripping members along the rod 212 without any concurrent retraction of the latter from the entrance opening 193a of the housing 192. Upon concurrent admission of pressure fluid into the shearing motor cylinder 200 through the line 200a, the blade 202 is raised together with the link 204. The upward movement of the link 204 rocks the bell crank lever 197 about the axis of the shaft 195, which causes the pawl 199 to engage one of the inside or front faces of the ratchet teeth on the ratchet wheel 196 so as to rotate the latter together with the shaft 195 through a predetermined angle in the direction of the brokenline arrow in FIG. 1. The wheel 205 is thus indexed through an angle corresponding to the distance between two of the pockets 206, which places the pocket 206 containing the just formed biscuit of molding compound in a slanted position relative to the vertical and brings the next empty pocket 206 into its biscuit-receiving position below the blade 202, while at the same time a pocket previously filled with a molding compound biscuit is brought into vertical alignment with the chute 160, whereby the last-named biscuit can drop into the chute and downwardly therethrough toward the injection unit. At any given time, of course, three of the pockets 206 of the transfer wheel 205 are filled with molding compound biscuits and three are empty, having discharged such biscuits into the chute 160.

When the injection piston 147 is retracted from the injection cylinder 148 by admission of hydraulic fluid into the cylinder 142 via the line 144, the pin 162 projecting from the side of the piston causes the slide 163 and its upwardly extending arm 165 to be moved toward the upright frame member 35. If the injection piston was previously advanced beyond a certain point in the cylinder 148, the hooked end of the latch member or pawl 166 will have dropped over the free edge of the side member 173 of the lower slide 170, as a result of which the retractive movement of the injection piston, through the intermediary of the pin 162 and slide 163, causes the slide 170 to be retracted against the force of the spring 177. Concurrently with the thus accomplished withdrawing of the fingers 171 and 172 of the lower slide 170 from the chute 160, the advancing of the upper slide 185 will cause the fingers 186 and 187 thereof to be positioned across the chute so as to support the molding compound biscuit 212b and any others located thereabove and to prevent the same from falling downwardly through the chute. At the same time, as soon as the slide 170 has been fully retracted, the biscuit 212a will be permitted to fall downwardly onto the arcuate supporting surface 158 of the frame member 157 in front of the injection piston 147.

With the injection piston retracted, the cam 167 connected with the latch member 166 reaches a position beyond the free end of the lever 180, permitting the latter to be pressed downwardly by the spring 181 so as to dispose the lever end in the path of the vertical edge of the cam 167. As the injection piston thereafter begins its succeeding advancing movement upon admission of hydraulic fluid into the cylinder 142 via the line 143 thereof, the pin 162 moves the slide 163 in the direction of the chute 160. Inasmuch as the cam 167 is in engagement with the end edge of the lever 180, the cam is pivoted in a counterclockwise direction (as seen in FIG. 3) about the axis of the pivot pin 165a, whereby the latch member 166 is angularly moved in the same direction so as to disengage the hooked end thereof from the side member 173 of the lower slide 170. The latter is immediately snapped into its advanced position by the spring 177 so as to introduce the fingers 171 and 172 again into the chute 160. Concurrently therewith, of course, the upper slide 185 is retracted through the intermediary of the link or connecting lever 191, whereby the molding compound biscuit 212b is permitted to drop through the chute onto the fingers 171 and 172.

It will be understood that as the slide 163 moves with the advancing injection piston 147 due to the presence of the pin 162, the latch member 166 and cam 167 are moved angularly (counterclockwise) until the cam slides away from the end edge of the lever 180 so as to reengage the lower edge thereof, at which time the spring 168 again becomes effective to press the hooked end of the latch member against the upper edge of the side member 173 of the slide 170. The arrangement is such that the said hooked end of the latch member will reengage the free end edge of the side member 173 as soon as and only when the injection piston has advanced beyond the aforesaid predetermined point in the injection cylinder 148.

The Anti-Backrinding Means

After molding compound has been injected into a mold, the mold wheel 46 is rotated in such a manner as to advance the filled mold to the curing region of the machine. The sudden release of the injection pressure theretofore exerted on the molding compound in the mold cavity, as well as the thermal expansion of the compound in the cavity, tend to bring about an outward flow of the molding compound from the cavity and through the injection sprue or sprues. This outward flow leads to the formation of cavities or craters and like defects, commonly called "backrinding," in the molded parts, thereby rendering the same unfit for use or sale. In accordance with the present invention, this potential drawback is eliminated by the anti-backrinding means E which operate to plug the inlet end of each sprue during the entire curing operation, as will now be described in connection with FIGS. 1 to 8 and 10.

Referring first to FIG. 3, it will be remembered that the upper or radially outrmost mold operating rod 84 is hollow and that the end fittings 91 and 99 thereof are provided with respective axial bores 91a and 99a. Extending slidably and rotatably through the rod 84 and the bores 91a and 99a is a shaft 215 to the forwardmost end of which is secured in any suitable manner, as by a nut 215a, an arm 216. The arm 216 at its other end carries a pin or like plug member 217 rigidly affixed to the arm and extending substantailly parallel to the shaft 215. It will be understood, of course, that more than one plug 217 may be mounted on the arm 216 if the sprue elements for the various molds are provided with more than one sprue opening.

As hereinbefore noted, the housing 103 connected with the yoke 109 includes, in addition to the sections 103a and 103b constituting parts of the mold opening and closing means C, a section 103c which is secured to the other sections by the bolts 103d. The housing section 103c is provided with a central recess or passageway 218 into which projects that end of the shaft 215 remote from the arm 216. That portion of the passageway 218 which is located immediately adjacent the housing section 103b accommodates a pinion 219 which is rotatable within the housing section 103c but constrained against axial displacement therein. The pinion 219 is connected to the shaft 215 by means of a key 220 the purpose of which is to prevent any relative rotation between the pinion and the shaft while permitting some axial displacement of the latter relative to and through the pinion 219. The pinion is provided with a plurality of conventional gear teeth 219a (see FIG. 10) and with a peripheral element 219b defining a flat surface the function of which will be more fully explained presently.

The shaft 215 is provided at a point spaced from the pinion 219 with a shoulder-defining member 221, e.g. a snap ring, which provides an abutment for the base of a cam sleeve 222, the shaft 215 extending into the central recess 222a of the cam sleeve and being provided adjacent its end with another shoulder-defining ring or washer 223 locked in position by nuts 224. A spring 225 surrounding the shaft 215 is interposed between the washer 223 and the base of the cam sleeve recess 222a and provides a yielding connection between the cam sleeve 222 and the shaft 215. The cam sleeve 222 is constrained to axial reciprocal movement in the passageway or recess 218 and is prevented from executing any rotary movement by a key 226 provided on a plate or end member 227 secured to the outermost end of the housing section 103c by bolts 227a (FIG. 7), the key being adapted to enter a corresponding slot provided in the outer periphery of the cam sleeve 222. As clearly shown in FIG. 7, the cam sleeve is further provided in its outer periphery with a double-faced cam groove 228 into which extends a pin 229 rigidly affixed to a sleeve-shaped pinion 230 slidably surrounding the cam sleeve 222 and arranged in the housing recess 218 for rotational movement only, axial displacement of the pinion 230 being inhibited by the plate member 227 and a shoulder formed in the housing section 103c.

Reciprocally slidable in the housing section 103c at one side of the recess 218 thereof and transversely thereto is a rack 231 the teeth of which mesh with the teeth of the pinion 230 surrounding the cam sleeve 222. On the other side of the passageway 218 in the housing section 103c there is arranged a plate 232 which is connected at one end with a rack 233 having teeth meshing with the teeth of the pinion 230, and at the other end with a rack 234 having teeth which mesh with the teeth of the pinion 219. The rack 231 and the rack combination 233—234 are adapted to be shifted within the housing section 103c and radially inwardly of the latter by means of respective piston rods 235 and 236 (FIG. 1) connected with a pair of pistons (not shown) reciprocally arranged in corresponding pneumatic cylinders 237 and 238, the cylinders being provided, respectively, with fluid lines 237a—237b and 238a—238b. The cylinder 238 is supported by a transverse frame member 239 rigidly connected with the cross member 36 at one side thereof, and the cylinder 237 is supported by a bracket 240 rigidly connected to the opposite side of the cross member 36. As shown in FIG. 2, the piston rod 235 is provided with a transverse arm 241 extending to both sides of the piston rod and adapted to contact not only the upper or radially outermost end of the rack 231 but also the upper end of the corresponding rack 231' associated with the mold wheel 47. Similarly, the piston rod 236 is provided with a transverse arm (not shown) adapted to engage the rack-carrying plate 232 and its counterpart 232' associated with the mold wheel 47.

The operation of the anti-backrinding means E thus will be seen to be as follows:

When there is no need for plugging up the entrance to a sprue of a mold, the parts are in the positions thereof illustrated in FIGS. 3 and 7. Thus, the rack 231 is in its elevated position, the rack combination 233—234 is in its lowest position (opposite to that shown in FIG. 8), the pin 229 is in the outermost end of the cam groove 228, and the shaft 215 is so positioned as to locate the arm 216 in its inoperative position, i.e., extending upwardly toward the cross member 36.

Should it be desired to render the anti-backrinding means operative, say subsequent to completion of an injection operation, the rack 231 is depressed by the piston rod 235 projecting from the cylinder 237. As the rack 231 moves downwardly as seen in FIG. 3, the pinion 230 is rotated in a clockwise direction as seen from the right hand side of FIGS. 3 and 7. Concurrently therewith the rack combination 233—234 moves upwardly so as to rotate the pinion 219 through an angle sufficient to swing the arm 216 through an angle of 180°, whereby to position the pin or plug element 217 in alignment with the sprue of the mold. While this is happening, the engagement between the pin 229 and the cam groove 228 provided in the cam sleeve 222 causes the latter to be moved axially of itself in a direction away from the housing section 103b, which linear movement is imparted to the shaft 215 through the spring 225 and thus serves to bring the pin 217 into the entrance to the sprue of the mold. The spring 225 simultaneously acts as a shock absorber or cushioning means which prevents damage to the machine when the pin 217 is brought into solid contact with the mold sprue entrance.

It will be understood that the pinion 219 is constructed to complete the 180° rotation of the shaft 215 and its arm 216 at some time before the pin 229 has completely traversed the cam groove 228, which point of time corresponds to the instant at which the teeth 219a of the pinion 219 go out of mesh with the teeth of the rack 234 while the flat surface 234a of the latter comes into engagement with the correspondingly flat surface of the peripheral gear element 219b. As soon as this happens, further rotation of the shaft 215 and arm 216 is inhibited despite the fact that the rack 234 is still rising due to the continued rotation of the pinion 230 which is necessary and continues until the plug pin 217 is seated in the sprue entrance. At the termination of this movement, the pin 229 is located at the opposite and innermost end of the cam groove 228, while the racks 231, 233 and 234 are in the positions shown in FIGS. 8 and 10.

When it is desired to render the anti-brackrinding means inoperative again, the rack combination 233—234 is moved downwardly from its position shown in FIG. 8 by the piston rod 236 projecting from the cylinder 238. At the beginning of this movement, the pinion 219 does not rotate due to the sliding engagement between the flat surface portion 234a of the rack 234 and the flat surface of the pinion element 219b, as a result of which no rotation of the shaft 215 and arm 216 takes place. The pinion 230 is, however, being rotated at this time in a counterclockwise direction as seen from the right-hand side of FIGS. 3 and 7, whereby the cam sleeve moves inwardly of the housing section 103c due to the engagement of the pin 229 in the cam groove 228. This linear movement is transmitted to the shaft 215 through the engagement between the cam sleeve and the shoulder-forming snap ring 221, whereby the pin 217 is extracted from the sprue opening. When the shaft has been so linearly moved through a sufficient distance to clear the pin from the top carrier plate 79, the lowest tooth of the rack 234 engages one of the teeth of the pinion 219 and initiates the rotational movement of the latter and thereby the rotation of the shaft 215 and the arm 216 through the desired 180° to return the arm to the position thereof shown in FIG. 3.

The Mold Wheel Indexing Means

As hereinbefore set forth, a plurality of molds are associated with each of the mold wheels 46 and 47, it being contemplated in accordance with the present invention to provide, for example, forty molds on each mold wheel. It is further contemplated, however, to provide only one injection unit for each mold wheel. Accordingly, there are provided the means F for moving the mold wheels step by step so as to successively position each mold opposite and in alignment with the associated injection unit.

Referring particularly to FIGS. 1 and 2, it will be seen that there is loosely mounted on the main shaft 45 intermediate the journal 26 and the hub 48 of the mold wheel 46 an arm 242 which extends downwardly from the shaft and carries at its lower end a slide 243 provided with a finger 244 extending toward the mold wheel 46, the slide 243 being arranged for reciprocal sliding movement lengthwise of the arm by means of suitable guide track means 242a provided in the arm. A spring 243a normally biases the slide 243 upwardly along the arm 242. Fixedly connected with the mold wheel intermediate the latter and the arm 242, as by being welded to the portion 50 of the mold wheel 46, is a gear 245 provided with a plurality of teeth 246. The arrangement is such, as clearly shown in FIG. 2, that the finger 244 of the slide 243 can be moved into and out of the spaces between the gear teeth 246.

The slide 243 carries at its uppermost (radially innermost) end a transverse pin 243b which extends across a recess 242b provided in the arm 242. Slidably engaging the top of the pin 243b is an arm 247a of a rack 247 slidably mounted on the machine frame and having teeth which mesh with the teeth of a pinion 248 rotatably mounted on the machine frame. Also slidably mounted on the machine frame is a locking slide 249 provided with a rack 250 having teeth meshing with the teeth of the pinion 248, the slide 249 being further provided with a tapered finger 251 adapted to be moved into and out of the spaces between the gear teeth 246. Rigidly mounted on the machine frame is a double-acting pneumatic cylinder 252 provided with pressure fluid lines 252a and 252b and with a piston (not shown) connected to a piston rod 253 projecting from the cylinder and carrying at its front end a rack 254 having teeth also meshing with the teeth of the pinion 248.

Articulated to the stanchions 20 at one side of the machine frame by means of a pivot pin 255 is a double-acting hydraulic cylinder 256 having pressure fluid lines 256a and 256b and provided with a piston (not shown) connected to a piston rod 257 projecting from the cylinder toward the arm 242. At its front end, the piston rod 257 is articulated by means of a cross pin 258 to the arm 242 but not directly to the slide 243.

The operation of the mold wheel indexing means, therefore, is as follows:

When the mold wheel is at rest, the parts are in the position shown in FIG. 1, with the finger 251 of the slide 249 engaged in the space between two of the gear teeth 246, whereby the latter and the mold wheel are locked in position and cannot rotate. Should it be desired to index the mold wheel from one position to the next, pressure fluid is first admitted into the cylinder 252 through the line 252a thereof to retract the piston rod 253 and the rack 254. The pinion 248 is thus rotated in a clockwise direction (as seen in FIG. 1) to move the rack 250 and therewith the locking slide 249 radially outwardly of the mold wheel 46 so as to disengage the finger 251 from the gear teeth. Simultaneously, the rack 247 is moved upwardly alongside the arm 242, permitting the spring 243a to move the slide 243 upwardly until the finger 244 thereof enters the space between two of the gear teeth 246. The arm 242 is thus seen to be connected to the gear 245 through the intermediary of the slide 243 which performs in essence the function of a clutch.

Hydraulic fluid is then admitted into the cylinder 256 through the line 256b to advance the piston rod 257, which causes the arm 242 and therewith the gear 245 and mold wheel 46 to be moved angularly about the axis of the shaft 45. For the purposes of this invention, the stroke of the piston in the cylinder 256 is so predetermined that the arc of this rotary movement corresponds approximately to the pitch of the gear teeth 246 and is such as to move one mold away from the injection unit and bring the next mold into operative position relative to the injection unit. The piston rod 253 is thereafter advanced by admission of pressure fluid through the line 252b into the cylinder 252, whereby the rack 254 rotates the pinion 248 in a counterclockwise direction (as seen in FIG. 1) which advances the locking slide 249 radially inwardly of the mold wheel until the finger 251 again engages the gear wheel 245, while simultaneously the clutch slide 243 is moved outwardly along the arm 242 by virtue of the force exerted on the pin 243b by the arm 247a of the rack 247 which itself is being moved outwardly by the rotating pinion 248, to disengage the tooth 244 from the gear 245. The tapered construction of the locking finger 251 ensures that the same will find its own center between the teeth 246 of the gear 245 and assure accurate indexing of the mold wheel even though the stroke of the indexing motor 256—257, is somewhat more or less than one indexing pitch, whereby the ultimate stationary position of the mold wheel is precisely that required to align one mold accurately with the injection unit. Hydraulic fluid is then admitted into the cylinder 256 via the line 256a to retract the piston rod 257 and therewith the arm 242, no return rotation of the gear and mold wheel taking place due to the fact that the arm is again declutched from the gear 245.

*The Article Extracting Means*

For the purpose of the description of the present invention, it is assumed that the articles to be molded are cup-shaped elements 259. The means G for removing the molded articles from the cavity elements 55 as illustrated herein is particularly adapted for use in connection with molded articles which are entirely imperforate.

Referring now particularly to FIGS. 1 and 4, it will be seen that a double-acting pneumatic cylinder 260 provided with pressure fluid lines 260a and 260b is rigidly supported from the frame member 239 extending from the cross member 36. The cylinder 260 is provided with a piston (not shown) connected with a piston rod 261 projecting forwardly from the cylinder. The piston rod 261 carries on its front end a sleeve 262, the sleeve being rotatable on the piston rod with the aid of suitable bearings (not shown) but not axially displaceable relative threeto. Formed in the outer surface of the sleeve 262 is a double-faced cam groove 263 having a pair of linear end portions and a curved or angled central portion. The sleeve extends slidably through a bushing 264 rigidly supported on the frame of the machine through the intermediary of a bracket or arm 265, and the bushing carries a guide screw or bolt 266 provided with a projection 267 extending into the cam groove 263 on the sleeve 262.

Fixedly connected to the outermost end of the sleeve 262, as by means of a nut 268, is an arm 269 extending at right angles to the axis of the sleeve and the piston rod 261 and provided at its free end with an aperture 269a. Mounted in the apertude 269a of the arm 269 in a nozzle member 270 having a central passageway 271 and carrying at its front end an annular adapter bushing 272 which surrounds the adjacent end of the nozzle passageway 271 and is provided with a beveled surface 272a adapted for sealing engagement with the outermost rim surface of each cup-shaped article 259. The nozzle member 270, which is fixedly retained in the aperture 269a by means of a nut 273, is connected to a flexible hose 274 leading to a suitable source of vacuum (not shown).

In operation of the article extracting or ejecting means G, assuming the carrier plate 79 to have been swung into the position shown in FIG. 4 in conjunction with the movement of the intermediate carrier plate 77 against the fingers 73 and 75 of the brackets 72 and 74, pressure fluid is admitted into the cylinder 260 through the line 260a to retract the piston rod 261 and therewith the sleeve 262 through the bushing 264. Due to the engagement between the projection 267 of the bolt 266 and the cam groove 263 (first with the rearwardmost linear portion thereof and then with the curved central portion), the sleeve is first axially retracted and then rotated so as to move the arm 269 from the broken-line position thereof illustrated in FIG. 1 into a position in which the nozzle member 270 is aligned with the mold.

When the sleeve 262 is further retracted to bring the guide bolt projection 267 into the forwardmost linear portion of the cam groove 263, the adapter bushing 272 is brought into engagement with the rim of the molded article 259 (this being the solid-line position illustrated in FIGS 1 and 4) whereby suction is produced within the latter to cause it to adhere tightly to the adapter bushing.

Pressure fluid is then introduced into the cylinder 260 through the line 260b thereof, whereby the piston rod and the sleeve 262 are advanced. During the initial part of this movement, the sleeve 262, due to the fact that the projection 267 is riding along one of the linear end portions of the cam groove 263, is not rotated, whereby the nozzle member 270 is moved linearly away from the intermediate carrier plate 77 and draws the article 259 out of the cavity insert 55. It will be seen that at this time the fingers 73 and 75 constitute the abutments needed to oppose the suction force and to prevent any movement of the carrier plate 77 with the nozzle element 270. As soon as the latter and the article 259 have cleared the carrier plate 77 and the cavity element 55 thereof, the projection 267 first reaches the curved central portion of the cam groove 263 and then the last linear end portion thereof, as a result of which the sleeve 262 and therewith the arm 269 are first rotated and then moved linearly until the arm again reaches its broken-line position shown in FIG. 1. The suction through the line 274 and passageway 271 of the nozzle member 270 is now interrupted, permitting the article to fall into any convenient receptacle or conveyor means (not shown).

*The Sprue Clearing Means*

It will be understood that when the top carrier plate 79 is moved from the position thereof shown in FIG. 3 into the position shown in FIG. 4, a quantity 259a (FIG. 3) of the molding compound will remain entrapped in the sprue of the mold element 54. This quantity of molding compound is removed from the sprue by the means H shown in FIGS 1 and 4.

As shown in FIG. 1, a double-acting pneumatic cylinder 275 is rigidly mounted on the machine frame and provided with pressure fluid lines 275a and 275b and with a piston (not shown) connected to a piston rod 276 extending upwardly from the cylinder 275. At its outermost end, the piston rod 276 carries an arm 277 on which is mounted a drill 278 ground and shaped in accordance with the shape of the sprue to be cleared. The drill 278 is adapted to be rotated by compressed air fed thereto through a line 279.

In operation, as soon as the top carrier plate 79 has been moved to the position shown in FIG. 4, the piston rod 276 is advanced upon admission of pressure fluid into the cylinder 275 through the line 275b thereof, to introduce the rotating drill 278 into the sprue in the element 54. Upon completion of the clearing operation, suitable control means (not shown) cause pressure fluid to be admitted into the cylinder 275 through the line 275a thereof to retract the piston rod 276 and to thereby withdraw the drill from the sprue element 54.

*The Operation of the Machine*

Although the operation of each of the individual component mechanisms of the molding machine according to the present invention has been described hereinabove, it is deemed advisable to set forth at this point a description of one complete molding cycle carried out by the machine. For the purpose of this description it must be remembered, of course, that those parts of the various means C to H which have been described only in connection with the mold wheel 46 find their exact counterparts in association with the mold wheel 47. Moreover, although there are only one molding compound feeding and injection means D, one article ejecting means G, one sprue clearing means H, and one pair of anti-backrinding means-actuating cylinders 237 and 238 associated with each mold wheel, each mold is provided with its own mold operating rods 83 and 84—96, cam roller 126, toggle and yoke 121 and 109, and anti-backrinding means 216—217. Finally, it must be remembered that in the embodiment of the invention illustrated in FIGS. 1 to 10, both of the mold wheels are fixed to the shaft 45 and thus rotate in unison with the latter and with one another. For the sake of simplicity, however, the following operational description will again be set forth only in terms of the mold wheel 46.

At the start, it is assumed that the motor 256—257 of the mold wheel indexing means F has just been operated to position an empty mold, comprising three mold elements 54, 55 and 56, in axial alignment with the injection piston 147 and injection cylinder 148, the carrier plates 79 and 77 for the sprue and cavity elements of the mold being in their closed positions as shown in FIG. 3. The cam roller 126 associated with this mold, therefore, is in a straight portion of the channel 39, whereby the toggle mechanism 121—118—109 with the aid of the springs 108 and 114 exerts the necessary high clamping force on the carrier plates through the intermediary of the rods 84—96 and 83. At the same time also, the rack 231 is in its elevated position and the rack combination 233—234 in its lowered position, whereby the anti-backrinding arm 216 is swung upwardly to its inoperative position.

With the injection piston fully retracted due to admission of hydraulic pressure fluid into cylinder 142 via line 144, the lower slide 170 will have been similarly retracted to permit the lowermost biscuit 212a of molding compound located in the chute 160 to fall downwardly onto the support member 157 in front of the injection piston 147. As previously described, only this one biscuit can fall down at this time due to the fact that with the lower slide 170 retracted, the upper slide 185 is protracted across the chute 160 to support the biscuit 212b and any others located thereabove. It is to be noted, of course, that the injection cylinder 148 is at this time also retracted from the front face of the top carrier plate 79 due to the action of the three springs 156 arranged in the recesses 149b of the injection cylinder support 149, the extent of retraction of the injection cylinder being limited by the heads 154a of the shoulder bolts 154 disposed in the recesses 149a of the injection cylinder support.

Concurrently with the foregoing, preferably through the use of suitable control and synchronizing means (not shown) interconnecting the various fluid pressure motors, the piston rod 209 of the molding compound feeding unit is advanced to position the leading end of the molding compound tube 212 across the interior of the housing 192, whereupon the piston rod 201 of the shearing motor is advanced to cause the blade 202 to shear off a biscuit-shaped slice of the molding compound and to push the latter into the now uppermost and empty pocket 206 of the molding compound transfer wheel 205. As viewed in FIG. 1, the lowermost pocket 206 of the transfer wheel 205 is also empty at this time, the molding compound biscuit previously retained therein having dropped therefrom into the chute 160. Empty also are the two pockets 206 facing toward the right-hand side of FIG. 1, while the two pockets 206 facing toward the left-hand side of this figure are filled with one molding compound biscuit each.

Hydraulic fluid is now admitted into the injection motor cylinder 142 through the line 143 to cause the injection piston 147 to begin its advancing movement, i.e., its injection stroke. Initially, this advancing movement causes the cam 167 to be rocked about its axis 165a in such a manner by the lever 180 that the hooked end of the latch member 166 is raised and disengaged from the end edge of the side member 173 of the lower slide 170. The latter is, therefore, immediately advanced by the spring 177 so as to protract the fingers 171 and 172 across the bottom of the chute 160, the upper slide 185 being concurrently retracted through the intermediary of the link or lever 191, whereby the biscuits in the chute 160 are permitted to fall downwardly through the latter until the lowermost biscuit rests on the fingers 171 and 172 of the lower slide. Concurrently therewith, the piston rod 201 of the shearing motor is retracted by admission of pressure fluid into the cylinder 200 through the line 200a to move the blade 202 upwardly and to simultaneously rotate or index the transfer wheel 205 by one pocket through the intermediary of the link 204, bell crank lever 197, pawl 199 and ratchet wheel 196, to thereby position an empty pocket below the shearing blade and a full pocket above the chute, the biscuit retained in this pocket thus dropping into the chute and onto the uppermost molding compound biscuit still retained therein. The piston rod 209 is also retracted at this time through admission of pressure fluid into the cylinder 208 through the line 208a to reposition the gripping members 213 preparatory to the next molding compound feeding operation.

As the injection piston 147 moves forwardly, it pushes the biscuit of molding compound which was previously dropped onto the supporting surface 158 ahead of it into the injection cylinder 148 until the biscuit rim engages the annular flange 148a and the sprue plate 152 of the injection cylinder. The latter thereafter moves with the injection piston until the outer face of the sprue plate engages the front face of the top carrier plate 79 and the sprue element 54. Upon continued advancing movement of the injection piston through the now stationary injection cylinder, the molding compound is forced through the perforated sprue plate 152 into the sprue (or sprues) of the top element 54 of the mold and thence into the cavity defined within the intermediate mold element 55 between the bottom element 56 and the imperforate portions of the top element 54. As is well known in the art, the use of the "bottomless cylinder" method of injecting the molding compound into a mold leads to a uniform pressure distribution over the entire mold and thus affords a thorough sealing of the mold lands to ensure that the formation of flash therebetween during the injection operation is rendered virtually impossible. The same advantageous results obtains in accordance with the present invention, the thin, flexible diaphragm-like plate 152 ensuring that a uniform pressure is exerted over the entire area of the mold without the necessity of placing the molding compound directly in contact with the surface of the top mold element 54. Thus, this arrangement not only prevents the flow of molding compound outwardly between the mold elements, but also between the sprue plate and the top mold element due to the fact that the mating or contacting surfaces of the injection cylinder and the top carrier plate (with its mold element) are effectively self-sealing under the hydrostatic clamping pressure exerted thereon by the injection piston through the molding compound.

The use of the "three-plate" or "three-element" molds according to this embodiment of the invention is further advantageous since it facilitates and simplifies the removal or ejection of the molded parts from the mold cavities and admits of greater interchangeability of the mold elements, thereby considerably broadening the range of product types, sizes and shapes attainable by the machine and substantially enhancing the versatility and resultant economic desirability of the machine. Such molds also permit air to escape from the mold cavities to a better extent than other types of molds, whereby the possibility of formation of air blisters and like defects in the molded parts is greatly minimized.

At this point it appears advisable to note the operational conditions existing through the remainder of the machine. It will be understood that of all the molds associated with the mold wheel 46, the one seen immediately to the right of the injection unit cylinder 142 in FIG. 1 is empty, while all the other molds are filled with molding compound injected thereinto at a previous time. Moreover, the antibackrinding arms 216 associated with all of the molds except the one which was just filled, the empty one and the two seen immediately to the right of the empty mold in FIG. 1 are arranged in their operative positions with the pins 217 thereof extending into and closing the outermost ends of the sprues in the respective sprue elements 54.

Steam under high pressure is fed continuously through the closed circuit 43—40—42—41—44 in the mold wheel shield 30 (and through the corresponding circuit in the other mold wheel shield associated with the mold wheel 47). Other steam is fed independently through the conduits 59, 61, 62 and 63 into the concentric steam channels 57 and 58 of the mold ring 52 (and thence through the conduit 66 into the corresponding concentric steam channels of the mold ring 52′ mounted on the second mold wheel 47). Thus, the molds carried by those portions of the mold ringes 52 and 52′ which are located within the confines of the mold wheel shields are heated from two directions, to wit by the heat of the steam flowing through the channels 57 and 58 in the mold rings which reaches the respective molds by conduction, and by the heat of the steam flowing through the channels 40 and 41 in the mold wheel shields which reaches the respective molds by radiation and convection. The major proportion of the heat required for curing the various quantities of molding compound is, of course, supplied by the steam flowing through the channels 57 and 58. The shields for the mold wheels, however, in addition to supplying extra heat for the curing operations, also serve the highly important function of shielding the molds from drafts of relatively cold air during the curing operations. As will be readily understood by those skilled in the art, the temperature conditions existing behind the respective mold wheel shields and in the mold rings will be so predetermined that the compound in each mold will be completely cured (but not overcured) in the period of time that it takes to index the mold wheels through one complete rotation.

Turning now to the two molds located immediately to the right of the empty mold in FIG. 1 (which, it will be remembered, is immediately to the right of the mold into which molding compound has just been injected as previously described), it will be clear that as soon as the mold farthest to the right reached the indicated position thereof (concurrently with the arrival of the mold to be filled in alignment with the injection unit), the piston rod 236 was advanced, upon admission of pressure fluid into the cylinder 238 through the line 238b, so as to engage the plate 232 carrying the racks 233 and 234 associated with that mold. As these racks were moved from their position shown in FIG. 8, the associated pinion 230 was first rotated to cause the respective shaft 215 to be moved axially of itself and to the left as seen in FIG. 3 so as to clear the plug pin 217 on the arm 216 from the sprue of the mold element 54. As previously described, at a predetermined time during this movement of the rack combination 233—234, the teeth of the rack 234 came into engagement with the teeth 219a of the pinion 219 so as to set the latter into rotation, whereby the shaft 215 and the arm 216 were rotated through an angle of 180° to position the arm as shown in FIG. 1.

The same indexing operation which positioned the mold to be filled with molding compound in alignment with the injection unit, and which positioned the filled mold at the right of FIG. 1 so as to place the rack-carrying plate 232 into alignment with the piston rod 236, also positioned the filled mold shown immediately to the right of the empty mold in the indicated position. As this mold was moved into this position, the cam roller 126 thereof was displaced from its normal path of movement by the cam element 38a and the offset portion 39a of the channel 39 (see FIG. 5). This shifting of the cam roller was transmitted through the associated toggle 121 and toggle arms or links 118 to the respective yoke 109 so as to cause the latter and therewith the corresponding housing 103 to be moved to the left as seen in FIG. 3.

As previously described, the resulting movement to the left of the rods 83 and 84 first brought about a linear or parallel separation of the top carrier plate 79 and the sprue element 54 carried thereby from the intermediate carrier plate 77 and the cavity element 55 and molded article 259 carried by the same. This parallel movement is essential in that it facilitates stripping of the surface of the metallic element 54 from the molded part 259 and at the same time prevents uneven wear of the mold elements. During the so-initiated movement of the rod 84, however, the latter was rotated about its own axis due to the interaction of the guide bolt projection 98a with the cam groove 97, whereby the head 96 affixed to the front fitting 91 of the rod 84 was rotated through an angle of 90° into a position (see FIGS. 1 and 5) in which it was aligned with the slot 133 in the upper end region of the top carrier plate 79. As soon as this had occurred, the stop 140 carried by the associated pusher rod 138 came into engagement with the rear face of the mold ring 52, whereupon further movement of the yoke 109 and rod 83 caused the pinion 130 to be rotated over the rack 136—137 so as to pivot the top carrier plate 79 from a verical position into the horizontal position illustrated in FIGS. 1 and 4 to 6.

As soon as the plate 79 reached this position, pressure fluid was admitted into the cylinders 260 and 275 through the lines 260a and 275b thereof to move the respective piston rods 261 and 276 as hereinbefore described. As a result, the sleeve 262 carried by the piston rod 261 was rotated due to the interaction between the guide bolt projection 267 and the cam groove 263, so as to shift the arm 269 and the suction nozzle member 270 carried by the latter from the broken-line position thereof in FIG. 1 to the solid-line position shown in FIGS. 1 and 4, for the purpose of ejecting or extracting the molded article 259 from the cavity element 55, at which time the intermediate carrier plate 77 was pressed against the fingers 73 and 75 of the brackets 72 and 74 by the shoulder 92 on the rod 84 and by the shoulders 83b on the rod 83. At the same time, the advancing of the piston rod 276 brought the drill 278 into its operative position for clearing the sprue element 54 in the still horizontally disposed top carrier plate 79.

The final operational condition of the machine which remains to be considered is that involving the empty mold located immediately to the right (as seen in FIG. 1) of the mold aligned with the injection unit. The same indexing operation of the means 256—257 which brought the other molds into their described positions brought this mold from the ejecting position to its illustrated position. The actions which occurred for this purpose will, however, be more fully referred to presently in the description of the removal of the mold just being emptied from the ejecting position.

Referring now again to the injection operation itself, when the same has been completed, with the injection pressure taken up by the bracket 37 of the machine frame via the flange 71 on the mold ring 52, hydraulic pressure fluid is admitted into the cylinder 142 through the line 144 to initiate the retractive movement of the injection piston 147. As can be seen from FIG. 3, the arrangement is such that even though a small quantity 259a of the molding compound is located in the sprue of the mold element 54 after the injection operation is concluded, this quantity of the molding compound will be retained in the sprue by adhesion to the sprue wall, but will readily neck and break off at the aperture 152a of the sprue plate 152 when the latter and the injection cylinder are retracted from the mold.

The injection cylinder, is, of course, retracted to the full extent permitted by the shoulder bolts 154, and any excess quantity of molding material in the injection cylinder, since it does not enter the curing region of the machine, is not lost and may be used subsequently during the next injection operation. Thus, the present invention affords a considerable reduction of the molding scrap losses heretofore always encountered in injection molding operations of the "bottomless cylinder" type, whereby the overall cost of producing the molded articles is considerably reduced while at the same time the amount of labor and time which must be spent in the removal of cured molding scrap from the machine subsequent to each injection operation is to all intents and purposes completely eliminated.

It is evident, of course, that upon retraction of the injection piston and cylinder from the mold just filled and consequent release of the injection pressure, the molding compound injected into the mold cavity will tend to expand and separate the mold elements, a tendency which would subsequently be aided by the thermal expansion of the injected molding compound during the curing operation. This potential drawback is avoided by the present invention due to the provision of the springs 108 and 114 which exert a sufficient pull on the rods 84 and 83, respectively, and therethrough on the mold to completely nullify any tendency of the same to open under the action of the injected molding compound. This result, which has heretofore not been attainable since it was deemed technically and economically infeasible to clamp the mold plates during the curing operation, is thus attained by the present invention without any adverse effect on the economy of the production operation as a whole.

During the retraction of the injection piston, the movements of the piston rods 261 and 276 are reversed by admission of pressure fluid into the cylinders 260 and 275 via the lines 260b and 275a, whereby the molded article 259 is removed from the mold being emptied through a return movement of the arm 269 and nozzle 270 into the broken-line position thereof shown in FIG. 1, while the drill 278, having cleared the cured material 259a from the sprue element 54, is retracted and returned to its inoperative position (not shown). Simultaneously, the piston rod 236 is retracted by admission of pressure fluid into the cylinder 238 via the line 238a thereof.

It is again noted, at this point, that in accordance with the present invention molding compound is fed into the injection unit only when the quantity of molding compound already in the injection cylinder 148 becomes less than a predetermined amount. Stated in other words, molding compound is fed to the injection unit only as needed. This is accomplished by making the latch member 166 just long enough so that its hooked end drops past the end edge of the side member 173 of the lower slide 170 whenever the injection piston 147 reaches or passes a predetermined "bottoming" position within the injection cylinder 148. As long as the injection piston does not pass this position, the hooked end of the latch member 166 will merely ride back and forth along the upper edge of the side member 173 of the lower slide 170 during the reciprocal movement of the injection piston, as a result of which the slide 170 will remain in its protracted position with the fingers 171 and 172 thereof extending across the bottom of the chute 160 and preventing the lowermost biscuit of molding compound in the chute from dropping onto the supporting surface 158. Since the biscuit 212a would ordinarily be sufficient for two or three complete injection cycles, it will be understood that the injection piston 147 will not reach the aforesaid "bottoming" position until at the end of a given injection stroke there remains in the injection cylinder 148 a quantity of molding compound less than that required for another injection operation.

The mold wheel indexing means F is now again actuated in the manner hereinbefore described to disengage the rotation inhibiting tooth 251 of the blocking slide 249 from the gear 245 and to engage the finger 244 of the clutch slide 243 with the gear, whereupon the mold wheel is moved a sufficient distance to disposed the just filled mold at the first position to the left of the injection unit as seen in FIG. 1, to advance the empty mold into alignment with the injection unit, and to advance every other mold by one position. As soon as the indexing movement is completed, the piston rod 253 is reversed to reengage the motion-blocking finger 251 of the slide 249 with the gear while disengaging the finger 244 of the clutch slide 243 from the gear so as to permit return of the arm 242 to its starting position.

As the mold wheel is moved, the cam roller 126 of the just emptied mold leaves the offset portion 39a of the track or channel 39 and returns to the normal part thereof. This movement is translated by the toggle 121 and the yoke 109 into a reverse movement (to the right as seen in FIG. 3) of the rods 83 and 84 whereby the said just emptied mold is closed by an upward swinging movement of the top carrier plate 79 and a subsequent linear or parallel movement thereof and of the intermediate carrier plate 77 toward the mold ring 52, the head 96 on the rod 84 now being again turned crosswise of the slot 133 due to the interaction of the cam groove 97 and the guide bolt projection 98a.

At the same time, the just filled mold reaches a position in which the rack 231 (which was moved to its elevated position by the previous depression of the rack combination 233—234 by the piston rod 236) is in alignment with the piston rod 235 projecting from the cylinder 237. This piston rod is now advanced by admission of pressure fluid into the cylinder 237 through the line 237b to depress the rack 231, as a result of which the pinions 230 and 219 are set into rotation to rotate the shaft 215 associated with the just filled mold, and therewith the corresponding arm 216 from the inoperative position thereof shown in FIG. 3 to the operative position shown in FIG. 1 in which the sprue-blocking pin 217 is aligned with the sprue in the mold element 54, the closing linear movement of the pin toward the sprue being effected during the last part of the rotation of the pinion 230 at which time the pinion 219 is stationary so that the shaft 215 executes only a linear, axial movement.

All of the other heretofore described operations are now repeated and the same corresponding operational conditions will again obtain. Thus, the mold which was previously the second from the left of the injection unit is now completely behind the shield 30 and in the curing stage. The mold which was the farthest to the right of the injection unit is advanced to the ejecting position with an accompanying displacement of its cam roller 126 and the associated toggle 121, yoke 109 and mold operating rods 83 and 84—96 to permit opening of this mold, extraction of the molded article, and clearing of the sprue. The piston rod 235, having performed its function, is retracted in to the cylinder 237, and the piston rod 236, which was previously retracted, is now advanced to depress the raised rack combination 233—234 of the mold just appearing at the right-hand edge 32 of the shield 30. It will be understood, furthermore, that these operations and operational conditions will thereafter be repeated over and over again each time the mold wheel is moved to locate a new empty mold in alignment with the injection unit. Attention is again called to the fact that the very same operations are carried out in connection with the mold wheel 47, and thus no separate description of these operations as related to the mold wheel 47 is deemed necessary herein. It is to be noted, however, that although the machine according to the invention has been disclosed as a dual or duplex mold wheel or turret molding machine, it is within the contemplation of the present invention that the machine may comprise only one such mold wheel and its associated mechanisms or, alternatively, even more than two mold wheels. Moreover, although the arrangement so far described employs vertical mold wheels rotatable about a horizontal axis, it is also within the contemplation of the present invention that the machine may comprise one or more horizontal mold wheels rotatable about a vertical axis. Regardless of the construction, disposition and multiplicity of the mold wheels, however, the operation thereof will be exactly the same as hereinbefore described.

*Modifications of the Machine*

From the foregoing description of a preferred embodiment of the present invention, it may be readily gathered that the machine as well as some of its component mechanisms are susceptable to being modified in a number of ways. Some of the possible modifications will now be described, and wherever possible those parts which are identical with the corresponding parts illustrated in FIGS. 1 to 10 will be designated by the same reference numerals.

It may be found desirable at times to employ a two-plate mold rather than a three-plate mold. Such a mold is illustrated in FIG. 11 and will be seen to comprise a top or sprue element 280 and a bottom element 281, the sprue element being mounted in a carrier plate 282, and the bottom element being mounted in a recess formed in the mold ring 52. By way of distinction from the bottom element 56 of the three-plate mold, the element 281 of the two-plate mold defines in its upper surface the mold cavity 283 into which the molding compound is to be injected. The carrier plate 282 is in all respects identical with the top carrier plate 79 hereinbefore described, being provided in its uppermost end region with a circular recess 134 traversed by a longitudinal, rectangular slot 133, and being connected at its other end with a cross pin 129 affixed to a pinion 130 the teeth of which mesh with the teeth of a rack bar 136 slidably mounted in the mold ring 52. The mold operating rods 83 and 84 are substantially identical with those employed in the first described embodiment of the invention, differing therefrom only in that the shoulders 83*b* on the rod 83 and 95 on the rod 84 are eliminated. The opening and closing of the two-plate mold shown in FIG. 11 is thus seen to be identical with that described hereinabove with respect to the three-plate mold, and no specific description of this operation is, therefore, deemed necessary herein.

It may also be found desirable at times to operate only one of the mold wheels of a duplex molding machine of the type described hereinabove. Such an eventuality may arise, for example, when one of the mold wheels is in need of repairs, retooling or adjustment or when it is necessary to clean the mold parts associated with that mold wheel. To implement this concept of the present invention, means must be provided for selectively disconnecting either one of the mold wheels from the main shaft of the machine. An arrangement of this type is shown in FIGS. 12 to 14.

In this modification of the invention, as in the first described embodiment, a pair of journals 26 and 27 are mounted on the cross members 24 attached to the stanchions 20, the journals being secured to the cross members by means of the bolts 25. The arrangement differs from that illustrated in FIG. 2 in a number of respects. First it is to be noted that the two mold wheels 46' and 47' are constructed from imperforate plates 284 and 284' rather than in the form of the cross arms 50 and 50'. These plates are provided, respectively, with annular peripheral flanges 285 and 285' to which the mold rings 52 and 52' are affixed. The mold wheels are loosely mounted on, and thus freely rotatable relative to, the main shaft 45' which is rotatably supported by the journals 26 and 27. As shown most clearly in FIG. 14, the mold wheel 46' is provided with a hub 286 freely rotatably seated on the shaft 45' and retained in position against axial movement toward the mold wheel 47' by a retaining ring 287, while the mold wheel 47' is provided with a hub 288 (see FIG. 13) freely rotatably mounted on the shaft 45' and held in position by a retaining ring 289. The shaft further carries, at a location between the mold wheel 46' and the journal 26, a gear 290 having teeth 291 and fixedly connected to the shaft by means of a key 292. The indexing arm 242 is rotatably mounted on the hub of the gear 290 and is provided with a spring-biased and rack-actuated reciprocal clutch slide 243 equipped with a gear engaging finger 244, all the same as shown in FIGS. 1 and 2. The gear 290, therefore, as distinguished from the gear 245, is not permanently connected to the mold wheel 46'.

The hub 286 of the mold wheel 46' is provided in its outer surface with a plurality of axially extending recesses 293. Two such recesses are shown, but it will be understood that different numbers of the recesses 293 may be provided. Similarly, the hub 288 of the mold wheel 47' is provided with a pair of axially extending recesses 294. Slidably mounted on the main shaft 45' intermediate the mold wheels 46' and 47' is a clutch sleeve 295 which is provided at its opposite ends with two pairs of tongues or teeth 296 and 297, the clutch sleeve 295 being connected to the shaft 45' by means of a key 298 to prevent rotation of the sleeve relative to the shaft while permitting axial sliding movement of the sleeve along the shaft. In its center, the sleeve 295 is further provided with a peripheral groove 299 the purpose of which will be more fully explained presently.

Fixedly positioned on the floor or supporting surface 21 for the machine and at a location intermediate the stanchions 20 is a base member 300 supporting an upright shaft or post 301. Rotatably mounted in a suitable bearing structure 302 at the top end of the post is a pivot bolt or pin 303 which carries a two-armed lever 304, one arm 304*a* of which extends from the pivot pin toward the clutch sleeve 295, and the other arm 304*b* of which extends in the opposite direction. Rotatably journaled at the outermost end of the horizontal lever arm 304*a* is a roller 305 which extends upwardly into the groove 299 of the clutch sleeve 295. The second arm 304*b* of the lever 304 is constructed in the form of a handle or operating member. From the foregoing it will, therefore, be understood that the lever 304 may be angularly moved about its axis of rotation 303 to axially displace the clutch sleeve 295 along the shaft 45' in one direction or the other.

The lengths of the recesses 293 and 294 of the mold wheel hubs 286 and 288, and concurrently the lengths of the clutch sleeve teeth 296 and 297 are so chosen that when the clutch sleeve 295 is centrally located on the shaft 45', the teeth 296 project partly (approximately half-way) into the recesses 293 while the teeth 297 project partly into the recesses 294, whereby both mold wheels are positively and drivably connected to the main shaft 45' for rotation therewith. If, therefore, upon proper actuation of the indexing means F and in particular of the piston rod 253 thereof the finger 244 of the slide 243 is engaged with the gear 290, an angular displacement of the arm 242 through the intermediary of the piston rod 257 and cross pin 258 will result in a rotational movement of the shaft 45' and thus of the mold wheels 46' and 47'.

When the lever 304 is moved angularly, however, to shift the clutch sleeve axially along the shaft 45' until the teeth 296 are completely received within the recesses 293 of the hub 286 of the mold wheel 46', the teeth 297 of the clutch sleeve are completely withdrawn from the recesses 294 of the hub 288 of the mold wheel 47'. Upon rotation of the shaft 45', consequently, only the mold wheel 46' will be indexed from one position to the next while the mold wheel 47' remains stationary. Conversely, when the teeth 297 are completely received within the recesses 294 while the teeth 296 are completely withdrawn from the recesses 293, upon actuation of the lever 304 to move the clutch sleeve 295 in the opposite direction along the shaft 45', a rotation of the latter through the intermediary of the arm 242 and gear 290 causes the mold wheel 47' to be indexed from one station to the next while the mold wheel 46' remains stationary.

It will be appreciated that with an arrangement of this type the problem of supplying steam to the mold rings 52 and 52' carried by the mold wheels 46' and 47' is considerably more difficult and complex than with an arrangement of the type shown in FIGS. 1 and 2, since in that case the steam supply conduits 59, 61 etc. can rotate with the shaft. In the instant modified arrangement, however, where either of the mold wheels may be kept stationary while the other one rotates, it is not possible to arrange the steam supply conduits for rotation with the shaft 45'.

To overcome this difficulty, the mold wheels 46' and 47' are provided with specially constructed fittings or couplings 306 and 306'. Inasmuch as these two fittings or couplings are identical in every respect, only the structure of the fitting 306 will be specifically described herein. Referring particularly to FIG. 14, it will be seen that the fitting 306 comprises an outer ring 307 and an inner ring 308 concentric therewith. The outer ring 307 is fixedly connected to the mold wheel 46' by means of screws or bolts 309, and an annular layer 310 of insulating material or packing is interposed between the innermost edges of the rings 307 and 308 and the plate 284 of the mold wheel 46'. The outer ring 307 is provided on its inner surface with a central, circumferentially extending, stepped, radial ridge or projection 311, and the inner ring 308 is provided on its outer surface with a circumferentially extending radial ridge 312 adapted to fit against the shoulder formed by the ridge or projection 311 of the outer ring. The inner ring is further provided at diametrically opposed locations with angled bores 313 and 314 which extend from the outermost edge of the inner ring to respective locations intermediate said outer edge and the ridge 312 and intermediate the ridge 312 and the inner edge of the inner ring. At their outermost ends the bores 313 and 314 are internally threaded to permit connection thereto of conduits 315 and 316.

Formed in the outer ring 307 at its uppermost region are two radially upwardly extending bores 317 and 318 which are internally threaded at their outer ends to receive conduits 319 and 320 leading to the inlet and outlet ends of the steam channels within the mold ring 52. The annular space between the inner and outer fitting rings 307 and 308 to either side of the abutting ridges 311 and 312 is filled with groups of annular packing plates 321 and 322, the middle ones of the group of packing plates 321 being spaced from one another so as to provide a central annular channel 323 establishing communication between the bore 313 of the inner ring 308 and the bore 317 of the outer ring 307, and the middle ones of the group of packing plates 322 being spaced from one another so as to define an annular channel 324 establishing communication between the bore 314 in the inner ring 308 and the bore 318 in the outer ring 307. The respective groups of packing plates 321 and 322 are retained within the space between the inner and outer rings of the steam fitting 306 by retaining rings 325 and 326 threaded into the opposite ends of the outer ring 307.

As previously stated, the fitting or coupling 306' is identical with the coupling 306, being affixed to the mold wheel 47' by bolts 309' and being connected with steam flow conduits 315' and 316' leading into the inner ring and with conduits 319' and 320' leading into the outer ring. The conduits 315 and 315' are connected by a fitting 327 to a supply conduit 328, and the conduits 316 and 316' are connected by a fitting 329 to an exhaust conduit 330.

It will, therefore, be readily appreciated that steam can be fed from a source thereof through the conduit 328 and the conduits 315 and 315' to the mold wheels 46' and 47' and exhausted therefrom via conduits 316, 316' and 330 at all times without connecting the conduits with the shaft 45' for rotation therewith. This is accomplished by virtue of the fact that the inner rings of the steam couplings 306 and 306', being supported by the stationary pipes 315—316 and 315'—316' are always stationary while the outer rings are slidable relative thereto and can move over the inner rings whenever the mold wheels 46' and 47' are rotated with the shaft 45'. The fittings 327 and 329 may, of course, be constructed in the form of gate valves or the like to enable the steam flow to either mold wheel to be interrupted when that mold wheel is held stationary for any reason whatsoever.

If it is desired to heat the molds in the mold rings 52 and 52' electrically rather than by the use of steam, a slightly modified construction must be used, as shown in FIGS. 15 and 16. Surrounding the hub 286 of the mold wheel 46' is a stationary ring body 331 in the outer surface of which are arranged a pair of slip rings 332 and 333, the former of which is connected by a conductor 334 to an insulated binding post 335 mounted on the machine frame and connected in turn to a power line 336, while the ring 333 is connected by a conductor 337 to an insulated binding post 338 mounted on the machine frame and connected in turn to a power line 339. Rigidly mounted on the plate 284 of the mold wheel 46' by means of insulating bushings 340 are two brushes 341 and 342 in sliding contact with the rings 332 and 333, respectively, the brushes 341 and 342 being further connected by conductors 343 and 344 to the heating elements carried by the mold ring. Although not specifically illustrated, the mold wheel 47' is similarly equipped with slip rings, brushes and associated elements to conduct electric current to the heating elements carried by its mold ring 52'.

In accordance with still another modification of the invention, the springs 108 and 114 which serve to apply to each closed mold a clamping force sufficient to overcome the tendency of the injected molding compound to open the mold, especially during the curing operation when the molding compound has a tendency to expand under the influence of the externally applied heat, may be replaced by hydraulic means in the manner illustrated in FIG. 17. As there shown, the toggle arms 118 which are articulated at one end to the toggle 121 are connected at their other ends by means of axially aligned pivot pins 345 to a yoke 346 which, although basically similar to the yoke 109 shown in FIG. 3, differs from that yoke in a number of respects.

More specifically, the yoke 346 is provided adjacent its uppermost (radially outermost) and lowermost (radially innermost) edges with a pair of openings 347 and 348 and in its center with an opening 349. The opening 347 slidably accommodates a hollow tie rod 350 connected at one end to the mold operating rod 84 and provided adjacent that end with an annular shoulder-forming flange 351 which under normal conditions is slightly spaced from the thrust bearing 105 surrounding the tie rod 350 at the front face of the yoke 346. Similarly, the opening 348 in the yoke 346 slidably accommodates a tie rod 352 connected at one end to the other mold operating rod 83. At their ends remote from the yoke 346, the tie rods 350 and 352 are reduced somewhat in diameter, as shown at 350a and 352a, thereby providing respective annular shoulders 350b and 352b facing rearwardly (inwardly) of the machine. Thus, the tie rods 350 and 352 are essentially extensions of the mold operating rods 84 and 83, respectively.

Mounted on the reduced diameter portions 350a and 352a of the tie rods is a rigid cross-head 353. Affixed to the cross-head 353 at the face thereof directed toward the yoke 346 is a mounting plate 354 which supports a single-acting hydraulic cylinder 355 provided with a fluid flow line 356. Reciprocal within the cylinder 355 is a piston 357 which carries a piston rod 358 extending slidably through the front end of the cylinder 355 toward the yoke 346. Adjacent its outermost end, the piston rod 358 is reduced in diameter, as shown at 358a, to provide an annular yoke-engaging shoulder 358b. The reduced diameter portion 358a of the piston rod 358 extends through the opening 349 in the yoke 346, and the piston rod is fixedly connected to the yoke by means of a nut 359 threaded onto the outermost end of the reduced diameter portion 358a at the front face of the yoke.

The cross-head 353 is locked to the tie rod 352 by means of nuts 360 threaded onto the outermost end of the reduced diameter portion 352a thereof. The reduced diameter portion 350a of the tie rod 350 is provided with an extension 350c which is externally threaded and projects beyond the rear face of the cross-head 353. Threaded onto the extension 350c is a sleeve or bushing 361 which is provided at the end remote from the cross-head with an annular flange or shoulder 361a. Seated on the bushing 361 in the gap between the flange 361a and the cross-head is a thrust bearing 362 the axial thickness of which is equal to the axial length of the main part of the bushing 361. The entire assembly of the bushing and bearing is locked in position on the tie rod extension 350c by a spanner nut 363 or the like and thus constitutes the means for locking the cross-head to the tie rod 350.

At its upper end, the cross-head 353 supports a multi-section housing 364 which is affixed to the cross-head by means of suitable bolts (not shown in FIG. 17 but essentially the same as the bolts 103d shown in FIG. 7). The housing sections 364a and 364b are substantially identical in all respects with the housing sections 103b and 103c, respectively, shown in FIG. 3, the housing 364 thus differing from the housing 103 only in that no section corresponding to the section 103a of the latter is provided. The housing section 364a surrounds and accommodates the thrust bearing 362 which is the same as the thrust bearing 107 shown in FIG. 3, while the housing section 364b surrounds and accommodates the pinion 219, the cam sleeve 222, the pinion 230 and its guide pin 229, the rack 231, and the rack combination 233—234 (not shown in FIG. 17) all of which are exactly the same as the corresponding elements shown in FIG. 3. As in the first described embodiment of the invention, the anti-backrinding shaft 215 extends from a point within the housing section 364b through the cam sleeve 222, the pinion 219 to which it is keyed as shown at 220, the tie rod extension 350c within the housing section 364a, the tie rod 350 and the mold operating rod 84 to a location in front of the mold ring 52 where it carries the anti-backrinding arm 216 on which the sprue-plugging pin 217 is mounted.

In operation, the fluid in the hydraulic cylinder 355 is maintained under a constant pressure at all times, and it will be understood that during the opening and closing of the mold 54—55—56 associated therewith the cylinder 355 is traversed to the left and to the right, respectively, along with the mold operating rods 83 and 84 through the intermediary of the tie rods 350 and 352 and the cross-head 353. During the final part of the mold-closing movement, the yoke 346, under the closing action of the toggle 121 and the toggle links or arms 118, causes the piston 357 to be pushed a short distance into the hydraulic cylinder against the pressure of the fluid within the latter. In this manner, there is applied to the mold operating rods 83 and 84 the tension required to prevent the mold elements 54 and 55 and their respective carrier plates 79 and 77 from being separated from one another and from the mold element 56 by the injected molding compound once the injection pressure is released. The reverse occurs during the initial part of the mold opening operation, the respective movement of the toggle 121 and its links 118 at this time permitting the piston 357 to be forced a short distance out of the cylinder until the piston reaches the outer limit of its stroke. Thereafter, any further opening movement of the toggle and the toggle links causes the piston and the cylinder 355 to be carried along with the mold operating rods as a unit.

The distance over which the piston moves in being forced into or out of the hydraulic cylinder during the final portion of the mold closing operation and the initial portion of the mold opening operation of the toggle and the toggle links depends generally on the thickness of the intermediate carrier plate 77 and the cavity element 55 mounted therein. If, on the one hand, the intermediate carrier plate and its cavity element are relatively thin, the piston is forced into the cylinder 355 only a relatively short distance. In this case, practically all of the motion afforded by the toggle 121 is employed for traversing the mold operating rods 83 and 84 in closing the mold, with only a very small part of the final toggle movement being employed in forcing the piston into the cylinder to exert the final clamping pressure. If, on the other hand, the intermediate carrier plate 77 and its cavity insert 55 are relatively thick, the piston is forced into the cylinder a greater distance than in the case of the thin cavity insert, so that a relatively larger portion of the final closing movement of the toggle is employed in forcing the piston into the cylinder to exert the final clamping pressure.

The advantages inherent in the use of a hydraulic mold clamping arrangement of the type shown in FIG. 17 will be readily apparent. With such an arrangement, a greater variation in mold heights and mold cavity plate thicknesses can be tolerated without any adverse effect on the mold clamping pressure, than could be where a spring is used for providing the necessary force. Thus, for example, the elastic properties of any given spring 108 may enable it to be used with a plurality of cavity inserts 55 differing from one another by a few thirty-seconds of an inch, while the hydraulic piston and cylinder means shown in FIG. 17 permits the use of cavity elements differing from one another by as much as an inch or more. The only limiting factor to be considered in choosing the thickness of the mold cavity insert is that at some point, assuming that there is available an ample piston stroke in the hydraulic cylinder 355, the angularity of the toggle and toggle links may be too great at the instant of full mold closure for the available toggle operating torque.

In the first described embodiment of the invention, the movements of the toggle 121 and its toggle links or arms 118 are effected through the intermediary of an arm 123 and a bell crank lever 124 carrying a cam roller 126 which rides along a combination guide and cam track 34—39, the cam roller being displaced in the cam track section 39 sequentially in opposite directions at a single station, to wit the ejection station (which is the second station before the injection station as illustrated in FIG. 1). According to a further modification of the present invention, however, it is possible to employ hydraulic means for effecting the displacements of the cam roller and its associated elements and thus of the toggle and the toggle links for each mold. Broadly, such means comprise two individual hydraulically actuated roller-shifting units one of which, the one for opening the molds, is located at the station preceding the ejection station, while the other unit, the one for closing the molds, is located at the station following the ejection station. The first of these units is illustrated in FIG. 18 and the second in FIGS. 19 and 20.

Referring first to FIG. 18, it will be seen that the mold opening unit according to this embodiment of the invention is mounted on the transverse frame member 239 (which is rigidly connected with the cross member 36) and comprises a bracket structure 365 which supports a double-acting hydraulic cylinder 366 having reciprocally arranged therein a piston (not shown). Extending out of the cylinder 366 and downwardly relative thereto is a piston rod 367 connected to the said piston and carrying at its outermost end a head 368. Articulated to the head by means of a pivot pin 369 is the bifurcated end 370 of one arm of a bell crank lever 371 pivotally mounted on the frame member 239 at 372, the other arm of the bell crank lever 371 extending downwardly beyond the frame member 239 and into a gap 373 defined below the frame member and between a pair of lateral extensions 374 and 375 thereof. At its outermost end, the last-named arm of the bell crank lever 371 carries a roller 376.

The frame member extensions 374 and 375 support a pair of axially aligned bushings or slide bearings 377 and 378, respectively, in which is reciprocally slidably mounted an actuating rod 379. The actuating rod 379 is provided intermediate its ends with a shoulder-forming flange 380 and with a recess 381 spaced a short distance from the flange 380. The roller 376 of the bell crank lever 371 extends into the recess 381 in the actuating rod, and the flange 380 is adapted to engage each cam roller 126 as the same arrives at the mold opening station immediately preceding the ejection station, i.e., the station shown as the third to the right from the injection unit in FIG. 1.

In operation, the mold opening unit is normally in the condition shown in FIG. 18. When a closed mold having a cured article 259 in the cavity of the mold element 55 arrives at the station preceding the ejection station i.e., at the station at which the piston rod 236 of the cylinder 238 (FIG. 1) is advanced to depress the rack combination 233—234 for moving the anti-backrinding means arm 216 and pin 217 to the inoperative posiiton thereof, the piston rod 367 of the cylinder 366 is advanced to pivot the bell crank lever 371 about its axis 372 in a counterclockwise direction as seen in FIG. 18. This occurs, of course, after the deactuation of the anti-backrinding means. The actuating rod 379 is thus positively displaced to the right from its illustrated position through the intermediary of the roller 376, with the result that the flange 380 displaces the cam roller 126 correspondingly. The toggle 121 is thus rotated and the toggle links 118 shifted so as to displace the yoke 109 to the left, whereby the previously described sequence of steps of the mold opening operation takes place to bring the top carrier plate 79 and the intermediate carrier plate 77 into the positions illustrated in FIGS. 4 to 6 and 19. As soon as the actuating rod 379 has completed the toggle-actuating and mold-opening movement of the roller 126, the piston rod 367 is retracted into the cylinder 366 so as to swing the bell crank lever 371 in the opposite direction and return the actuating rod to its illustrated position preparatory to the arrival of the next closed mold.

It will be understood that the use of the hydraulic mold opening unit of FIG. 18 renders unnecessary the provision of the cam and guide track 39 defined by the bracket 38 which extends, in the first described embodiment of the invention, between the upper end edges 32 of the mold wheel shield or housing 30. Although theoretically no guide means for the roller 126 should now have to be used, in practice it is found that the spring 141, which surrounds the rack bar pusher rod 138 between the yoke 109 and the stop 140 carried by the pusher rod and is compressed during the mold opening operation for the purpose of swinging the top carrier plate 79 into its horizontal position, tends to exert on the yoke 109 a force sufficient to move it slightly to the right, as seen in FIG. 18, if no opposition to return movement of the cam roller 126 toward the position illustrated in FIG. 18 is provided. This, therefore, would cause the mold operating rods 83 and 84 to be moved somewhat to the right from the position which they occupy when the mold is open, as shown in FIGS. 4 to 6, as a result of which the top carrier plate would be tilted slightly upwardly while the shoulders 83b and 92 on the rods 83 and 84 would be retracted slightly from the rear face of the intermediate carrier plate 77.

A proper functioning of the machine at the ejection station would thus be rendered substantially impossible, since the sprue-clearing drill 278 could not enter the sprue of the mold element 54 and since the intermediate carrier plate would not be immovably positioned against the pressure of the suction nozzle 270 of the article extraction means G. For the purpose of avoiding this potential defect, there is provided, in accordance with the instant modification of the present invention, a short guide track (not shown) which extends from the mold opening station past the ejection station and to the mold closing station, this track receiving the cam roller 126 while the open mold is moved to and located at the ejection station and preventing any premature or undesired movement of the roller and consequently any mold-closing movement of the rods 83 and 84.

Once the so opened mold has been emptied and the ejecting means G and sprue-clearing means H rendered inoperative again, indexing of the mold wheel brings the open mold to the closing station, i.e., the station between the ejection and injection stations shown in FIG. 1. Referring now particularly to FIGS. 19 and 20, it will be seen that the mold closing unit comprises a double-acting hydraulic cylinder 382 rigidly supported (in a manner not specifically illustrated on the machine frame, with the front cross-head of the cylinder abutting against a vertical frame member 383. Rigidly connected with the frame member 383 is a bracket 384 substantially L-shaped in cross-section. Fxed to the horizontal portion 384a of the bracket 384 by means of bolts 385 is a guide bracket 386 in which is mounted a slide bearing or sleeve bushing 387 through which extends the piston rod 388 of a piston (not shown) reciprocally arranged in the hydraulic cylinder 382. The outermost end section of the piston rod 388 extends through a slide bearing or sleeve bushing 389 mounted on a frame member 390 in axial alignment with the bushing 387.

The piston rod 388 carries intermediate its ends a head 391 which is fixedly connected with the piston rod by means of a pair of tapered pins or wedges 392. A portion of the head 391 depending downwardly from the rod 388 defines a shoulder 393 facing forwardly of the machine, which shoulder is adapted to engage the cam roller 126 associated with each open mold arriving at the mold closing station. At a location forwardly of the shoulder 393, the head 391 is provided with a bore 394 in which is fixedly retained a stop pin 395 which projects downwardly out of the bore 394 and thus is located opposite the shoulder 393. Extending into the gap between the shoulder 393 and the stop pin 395 is the free end of an arm 396 which is fixed at its other end to the hub 397 of a gear 398 journaled in a part 399 of the machine frame. The teeth of the gear 398 mesh with the teeth of a rack 400 slidably mounted in the frame part 399 and connected at one end to a piston rod 401 attached to a piston (not shown) arranged in a single-acting hydraulic cylinder 402 also mounted on the machine frame. The hydraulic fluid in the cylinder 402 is always under pressure so as to keep the rack 400 and the arm 396 in the positions thereof illustrated in FIG. 20. When in the position illustrated, the arm 396 in conjunction with the shoulder 393 defines a gap 391a into which the cam roller 126 of an open mold enters when it leaves the previously mentioned short guide track extending from the opening to the closing stations. Thus, even at this time premature partial closing of the mold due to the action of the spring 141 on the yoke 109 is inhibited since the necessary movement of the cam roller 126 to the left as seen in FIG. 19 is prevented by the arm 396 which abuts against the stop pin 395 carried by the still stationary head 391.

In operation, when the open mold has arrived at the closing station and the cam roller 126 associated with that open mold is located between the shoulder 393 and the arm 396 as shown, hydraulic fluid is admitted into the cylinder 382 to retract the piston rod 388 and therewith the head 391 from the stop therefor constituted by the frame member 390 and the bearing sleeve 389. As the head 391 moves to the left, as seen in FIG. 19, it moves the cam roller 126 accordingly, and the latter, due to the movement of the stop pin 395 with the head 391, pushes the arm 396 ahead of it and swings it out of the way about the axis of rotation thereof as defined by the axis of the gear hub 397. This swinging movement and the consequent rotation of the gear 398 causes the rack 400 to be moved to the right as seen in FIG. 20 to force the piston rod 401 and the piston connected therewith further into the cylinder 402 against the pressure of the hydraulic fluid retained therein.

The movement of the cam roller 126, of course, shifts the toggle 121 and the toggle links 118 so as to displace the yoke 109 to the right as seen in FIG. 19, whereupon the hereinbefore described sequence of steps of the mold closing operation is effected through the intermediary of the rods 83 and 84 and the elements associated therewith. The arrangement is such that the toggle 121 is moved a short distance, say about 1/16", past dead center to ensure that the toggle remains in its mold closing position. It will be understood that at this time no counterpart of the aforesaid short guide track which passes the ejection station is necessary, since the spring 141 can no longer have an undesired action on the mold. As soon as the cam roller 126 has passed the tip of the arm 396, the pressure of the hydraulic fluid in the cylinder 402 causes the rack 400 to move to the left as seen in FIG. 20, and the consequent rotation of the gear 398 tends to bring the arm 396 back into the space between the stop pin 395 and the shoulder 393 of the head 391. The piston rod 388 is now again advanced by the hydraulic cylinder 382 to return the head 391 to its position illustrated in FIG. 19 preparatory to the arrival of the next open mold at the mold closing station.

The use of the hydraulically actuated mold opening and closing units as shown in FIGS. 18 and 19 considerably facilitates the operation of the machine as a whole. This will best be appreciated when it is considered that the use of the cam track 39a and cam element 38a for effecting the desired displacements of the cam rollers 126 necessitates the overcoming of the frictional interaction between the surfaces of such cam means and the cam rollers. Accordingly, since the movement of the cam rollers into and out of their mold closing positions is effected during the indexing of the mold wheel, this frictional interaction places a greater load on the hydraulic indexing motor 256—257. In contradistinction to this, with the hydraulic mold opening and closing units of this embodiment of the invention, the indexing motor is completely relieved of the load of effecting the mold opening and closing movements of the cam rollers, whereby less work is necessary to index the mold wheel from one station to the next. Still further, the flange 380 of the actuating rod 379 and the shoulder 393 of the actuating head 391 are in only point contact with the respective cam rollers 126 and only for relatively short intervals of time, whereby the wear on the cam rollers which normally results from the rolling contact of the same with the cam track is substantially reduced.

In accordance with still another modification of the machine according to the present invention, the means for feeding the molding compound 212 to the shearing device and transfer wheel 205 as shown in FIG. 2 may comprise a plurality of friction rollers in surface contact with the molding compound tube, which rollers would be used in lieu of the prong-type gripping members 213 and could be actuated in any suitable manner, as through the intermediary of a ratchet and pawl type of unidirectional drive mechanism (not shown) actuated by the stock feed motor 208—209.

It is also possible, in accordance with yet another modification of the present invention, to replace the suction-type article extracting or ejecting arrangement shown in FIGS. 1 and 4 by a pin-type ejecting arrangement by means of which the molded articles 259 would be positively pushed out of the mold cavities rather than being drawn out of the same by suction. Such a pin-type ejecting mechanism could be used with any type of molded article and is not limited to use with imperforate articles as is the suction-type mechanism herein disclosed. In view of the fact that only minor structural changes would be necessary to substitute the pin-type ejector, which could be so disposed as to enter the space between the intermediate carrier plate 77 and the mold ring 52, for the suction-type ejector, the former is not specifically illustrated or described herein.

It is to be understood that any one of the modifications so far described can be employed in conjunction with any one or more of the remaining modifications. Thus, merely by way of example, the machine could be equipped with the hydraulic mold clamping arrangement shown in FIG. 17 and the hydraulic toggle-actuating units shown in FIGS. 18 and 19.

Having thus described my invention, what I claim and desire to protect by Letters Patent is:

1. In an automatic rotary turret injection molding machine having a rotatable shaft and at least one mold-carrying member supported by said shaft for rotation about the axis thereof; means for indexing said shaft through angular increments corresponding to the angular spacing between the molds on said mold-carrying member, comprising a gear carried by said shaft, means operatively interconnecting said gear and said shaft to inhibit relative rotation therebetween, an arm freely rotatably mounted on said shaft and extending substantially radially therefrom, a clutch slide carried by said arm for reciprocal sliding movement therealong, said clutch slide being provided with a first finger engageable with and disengageable from said gear, spring means carried by said arm and urging said clutch slide in a direction tending to cause engagement between said first finger and said gear, a pinion mounted for rotation about a stationary axis, a first rack meshing with said pinion and provided with an extension slidably engaging a part of said clutch slide for controlling the positioning of the latter relative to said arm and thereby the state of engagement of said first finger with said gear, a locking slide provided with a second finger engageable with and disengageable from said gear for inhibiting and permitting rotation thereof, respectively, a second rack connected with said locking slide and meshing with said pinion, first motor means drivingly connected to said pinion for rotating the latter so as to displace said first and second racks in synchronism with one another, whereby upon movement of said clutch slide to bring said first finger into engagement with said gear said locking slide is moved to disengage said second finger from said gear, and vice versa, and second motor means drivingly articulated to said arm for angularly moving the latter about the axis of said shaft.

2. In a machine according to claim 1, wherein said mold-carrying member is fixedly connected with said shaft; means fixedly connecting said gear to said mold-carrying member to thereby establish the non-rotating connection between said gear and said shaft.

3. In a machine according to claim 1, wherein said mold-carrying member is freely rotatably mounted on said shaft; means interconnecting said gear and said shaft directly to establish the non-rotating connection therebetween, and clutch means operable to connect said mold-carrying member to and disconnect the same from said shaft for the purpose of inhibiting or permitting relative rotation between the latter and said mold-carrying member.

4. In an automatic rotary turret injection molding machine; rotatable mold wheel means, a plurality of multi-plate molds carried by said mold wheel means at respective, equi-angularly spaced peripheral locations, indexing means operable for rotating said mold wheel means step by step to successively position each of said molds in alignment at an injection location, means operatively connected with each of said molds and movable therewith for opening and closing said molds, means positioned adjacent said mold wheel means and in the path of movement of said opening and closing means for actuating said opening and closing means to open each mold as the same nears an ejection location and to close each mold as the same leaves said ejection location and is moved toward said injection location, means arranged at said ejection location for removing the molded articles from each of said molds while said molds are open, and drill means located adjacent said ejection location and movable into the sprues of said molds while said molds are open at the ejection location for clearing the sprues of said molds.

5. In an automatic rotary turret injection molding machine equipped with rotatable mold wheel means, a plurality of multi-plate molds carried by said mold wheel means at respective, equi-angularly spaced peripheral locations, and indexing means operable for rotating said mold wheel means step by step to successively position each of said molds in alignment at an injection location; the combination of means operatively connected with each of said molds and movable therewith for opening and closing said molds, means operatively connected with said opening and closing means for applying to said plates of the respective molds high clamping forces, and means positioned adjacent said mold wheel means and in the path of movement of a part of said opening and closing means for actuating said opening and closing means to deactuate said clamping means and to open each mold as the same nears an ejection location spaced from said injection location and to close each mold and to actuate said clamping means as the respective mold leaves said ejection location and is moved toward said injection location, with means carried by said mold wheel means adjacent each of said molds for blocking the sprues of the sprue plates of said molds after the latter leave said injection location, and rack and pinion means provided with cam slot and pin means for actuating and deactuating said sprue blocking means sequentially as the respective molds leave said injection location and as the respective molds arrive at said ejection location.

6. In an injection molding machine equipped with at least one multi-plate mold; the combination of means operatively connected with said mold for opening and closing the same, means operatively connected with said opening and closing means for applying to said plates of said mold a high clamping force, and means coacting with said opening and closing means for actuating the latter to deactuate said clamping means and to open said mold immediately prior to ejection of a molded article therefrom and to close said mold and to actuate said clamping means immediately subsequent to the ejection and prior to injection of molding compound into said mold, with means positioned adjacent said mold and moveable into each sprue in the sprue plate thereof for blocking each sprue subsequent to the injection and until just prior to the ejection.

7. In an injection molding machine according to claim 6; said sprue-blocking means for said mold comprising a shaft extending substantially parallel to the height of said mold, an arm attached to said shaft and oriented transversely to the axis of the latter, said arm and shaft being mounted for angular movement about the axis of said shaft and for linear movement along said axis, rack and pinion means operatively connected with said shaft for effecting angular and linear movements thereof in respective opposite directions, whereby said arm can swing through an arc in a plane parallel to the plane of said mold and can move toward and away from said mold, and at least one plug pin extending from said arm in the direction of said mold and adapted to be inserted into and to block the entrance to the sprue in said sprue plate of said mold.

8. In an injection molding machine according to claim 7; said opening and closing means comprising a plurality of toggle-actuated rods operatively connected with said plates of said mold, at least one of said rods being hollow, and said shaft of said sprue-blocking means extending rotatably and linearly displaceably through said one rod.

9. A rotary injection molding machine comprising a rotatable wheel and intermittent drive therefor, a series of equi-angularly spaced multi-plate molds on said wheel arranged in a circle centered on the axis of rotation of said wheel, injection means positioned at an injection station for injecting molding compound through a sprue plate on each mold when the respective molds are at said injection station, heating means cooperable with said molds for curing the injected molding compound while each mold passes from said injection station to a mold opening station, sprue blocking means movable from an inactive to an active position and co-operable with said sprue plates at said active position for blocking the sprues of said sprue plates to prevent backrinding of said injected molding compound during the curing thereof, the final movement of said sprue blocking means to said active position being approximately normal to the plane of said sprue plates, and means connected with the respective plates of each of said molds for opening and closing the latter and for clamping said mold plates together with a force sufficiently high to counteract the tendency of injected molding compound to separate the mold plates subsequent to release of the injection pressure.

10. In an injection molding machine including at least one mold having a sprue plate through which molding compound may be injected into said mold, injection means for injecting molding compound into said mold comprising a support, an injection cylinder carried by said support for axial reciprocal movement toward and away from said sprue plate, said cylinder being provided with a thin perforated flexible cover plate engageable with substantially the entire outer surface of said sprue plate when said cylinder is moved toward said sprue plate, said cover plate being locally deflectable so that the injection pressure within said cylinder is applied to said outer surface of said sprue plate through said cover plate during injection of molding compound into said mold, spring means connected to said cylinder for urging the latter away from said sprue plate, abutment means connected with said cylinder for limiting the extent of movement of said cylinder away from said sprue plate, an injection piston reciprocably moveable with respect to said cylinder, and motor means connected with said piston for causing said cover plate to move into sealing engagement with said sprue plate and compressing said molding compound within said cylinder during an injection stroke, whereby the molding compound within said cylinder is injected through said cover plate and said sprue plate into said mold.

11. A rotary injection molding machine comprising a rotatable wheel and intermittent drive therefor; a series of equi-angularly spaced multi-plate molds on said wheel arranged in a circle centered on the axis of rotation of said wheel; injection means positioned at an injection station for injecting molding compound through a sprue plate on each mold when the respective molds are at said injection station; means for heating said molds to cure said molding compound; means for opening said molds upon completion of curing to facilitate removal of the molded articles at an ejection station; and means positioned adjacent said ejection station for clearing the sprues of said sprue plates while the molds are open, said sprue clearing means comprising rotary drill means adapted to enter said sprues, means supporting said drill means for reciprocal movement between an operative position and an inoperative position thereof, said drill means being received in said sprues when in said operative position, and motor means connected to said supporting means for reciprocally moving the latter.

12. In a rotary injection molding machine, a support, shaft means rotatably journaled on said support, a first mold wheel rotatably journaled on said shaft means, a second mold wheel rotatably journaled on said shaft means, each of said mold wheels including a series of equi-angularly spaced molds thereon arranged in a circle centered on the axis of rotation of said wheel, means for injecting molding compound into the molds of each wheel at first and second injection stations positioned, respectively, adjacent to said first and second wheels, means for intermittently indexing said shaft means in an angular amount equal to the angular spacing between adjacent molds on said mold wheels, and clutch means connecting said wheels and said shaft means for selectively coupling either or both of said wheels to said shaft means.

13. A machine as described in claim 12 wherein said first and second mold wheels are axially spaced apart and said clutch means includes a sleeve member coaxially disposed about said shaft means between said wheels, said sleeve member being splined to said shaft means and being axially moveable between a first position wherein it drivingly engages only said first wheel, a second position wherein it drivingly engages said first and second wheel, and a third position wherein it drivingly engages only said second wheel.

14. A rotary injection molding machine comprising a framework; a rotatable wheel and intermittent drive therefor supported by said framework; a series of equi-angularly spaced multi-plate molds on said wheel arranged in a circle centered on the axis of rotation of said wheel and having a common inner radius and a common outer radius defining an annular zone within which said molds are carried; injection means carried by said framework for injecting a molding compound into each mold; first heating means circularly coextensive with said molds and carried by said wheel for curing the molding compound during intermittent rotation thereof said heating means including at least one circular heating element, the mean radius of said heating element falling within said annular zone, said heating element being located closely adjacent to the rearmost mold plates of said molds; second heating means circularly coextensive with at least a majority of said molds and carried by said frame for assisting said first heating means in curing the molding compound, said heating means including at least one arcuate heating element, the mean radius of said arcuate heating element also falling within said annular zone, said annular heating element being located closely adjacent to the most forward mold plates of said molds; and means for opening and closing said molds to allow removal of the molded articles therefrom upon completion of curing of the molding compound.

15. An automatic dual rotary turret injection molding machine comprising frame means; shaft means rotatably journaled on said frame means; first and second mold wheel means rotatably journaled on said shaft means; clutch means connecting each of said mold wheel means and said shaft means for selectively coupling either or both of said mold wheel means to said shaft means; a plurality of multi-plate molds carried by each of said mold wheel means at a plurality of respective, equi-angularly spaced peripheral locations; heating means carried by each of said mold wheel means coextensive with said molds for curing a molding compound in said molds; first and second shield means mounted on said frame means substantially coextensive with and positioned adjacent to each of said mold wheel means, each of said shield means being provided with a recess and with additional heating means for curing the molding compound in said molds; first and second injection means each mounted on said frame means adjacent one of said shield means and operable to engage said molds to inject molding compound thereinto through said recess upon arrival of the respective molds at an injection location opposite said recess; indexing means operable for rotating said shaft means step by step through angles equal to the angular spacing between adjacent molds to successively position said molds when empty in alignment with said injection means and to move said molds when filled through said shield means for curing the injected molding compound; a plurality of anti-backrinding means carried by each of said mold wheel means, one for each mold thereon, for blocking the mold sprues during the curing of said injected molding compound; means responsive to the depletion of molding compound in each of said injection means for supplying additional molding compound to each of said injection means; means carried by each of said mold wheel means for opening and closing said molds; means connected with said mold opening and closing means for clamping said molds together, when closed, with a force sufficiently high to counteract the tendency of injected molding compound to separate the mold plates due to thermal expansion of the molding compound during curing; actuating means positioned on said frame means in the path of movement of said mold opening and closing means for actuating the latter to release the clamping force and open each mold as the same nears an ejection location and to close each mold and apply the clamping force as the mold leaves said ejection location and moves toward said injection location; means carried by said frame means at said ejection location for removing the molded articles while said molds are opened; and means located on said frame means adjacent said ejection location for clearing the sprues of said molds while said molds are open.

16. In an automatic rotary turret injection molding machine having at least one rotatable mold wheel supporting a plurality of peripherally spaced multi-plate molds, means for opening and closing said molds comprising: operating rod means cooperative with at least the top mold plate of each mold for moving said plate axially and parallelly away from the remainder of the mold during the initial part of the opening operation and axially and parallelly toward the remainder of the mold during the final part of the closing operation; and means operatively connected between said operating rod means and said top mold plate of each mold for effecting an angular movement of said top mold plate about an axis parallel to the plane of said top mold plate during the final part of the opening operation and during the initial part of the closing operation, whereby the top mold plate is moved clear of the mold, when open, to facilitate subsequent removal of molded articles from the mold.

17. Mold opening and closing means as described in claim 16 in which said means for effecting angular movement of said top mold plate comprises: an axle rotatably carried by a part of said operating rod means and extending transversely thereto, said top mold plate being fixed to said axle for movement therewith; a gear coaxial with and fixed to said axle; a rack slidably carried by said mold wheel for reciprocal movement parallel to said operating rod means, the teeth of said rack meshing with the teeth of said gear; a pusher rod connected with said rack; a stop fixedly mounted on said pusher rod for movement therewith and adapted to engage said mold wheel; and spring means operatively interconnected between said stop and said operating rod means, whereby, when said stop is spaced from said mold wheel, said rack and said operating rod means move as a unit without rotation of said axle and angular movement of said top mold plate, while upon movement of said operating rod means subsequent to engagement of said stop with said mold wheel to immobilize said rack, said gear rolls over said rack to rotate said axle and angularly move said top mold plate.

18. Mold opening and closing means as described in claim 16 in which said mold opening and closing means further includes displaceable actuating means carried by said mold wheel and slidably engaging said operating rod means for limited movement with respect thereto in response to displacement of said actuating means; and means operatively connected between said operating rod means and said actuating means for clamping said mold plates of each mold together, when closed, with a force sufficiently high to counteract the tendency of injected molding compound to separate said mold plates.

19. Mold opening and closing means as described in claim 18 in which said clamping means include spring means under compression and having one end thereof reacting against said operating rod means and the other end thereof reacting against said actuating means.

20. Mold opening and closing means as described in claim 18 in which said clamping means comprises hydraulic piston and cylinder means operatively positioned between and connected to said operating rod means and said actuating means.

21. Mold opening and closing means as described in claim 20 in which said actuating means includes yoke means slidably mounted on said operating rod means intermediate the ends of the latter, and toggle means rockably mounted on said mold wheel and linked to said yoke means; said mold opening and closing means further including crosshead means fixedly connected to said operating rod means at the end of the latter remote from said mold plates; said piston and cylinder means comprising a single acting cylinder connected at one end with said crosshead means, and a piston carrying a piston rod which projects from the other end of said cylinder and is fixedly connected with said yoke means.

22. In an automatic rotary turret injection molding machine having a frame, at least one mold wheel rotatably supported by said frame, and a plurality of multi-plate molds positioned on the mold wheel for movement therewith, means for opening and closing said molds comprising; cam means fixedly carried by said frame adjacent said mold wheel; displaceable roller means carried by said mold wheel and actuated by said cam means; toggle means pivotally carried by said mold wheel and connected with said roller means; yoke means linked to said toggle means for reciprocal movement upon displacement of said roller means; rod means having one end thereof operatively connected with at least the top mold plate of each of said molds and another portion thereof in sliding engagement with said yoke means; and means under compression and reacting against both said rod means and said yoke means for applying to each of said molds while they are closed a clamping force of sufficient intensity to counteract the tendency of injected molding compound to open said molds.

23. A rotary injection molding machine comprising a rotatable wheel and intermittent drive therefor; a series of equi-angularly spaced multi-plate molds on said wheel arranged in a circle centered on the axis of rotation of said wheel; injection means positioned at an injection station for injecting molding compound through a sprue plate on each mold when the respective molds are at said injection station; heating means cooperable with said molds for curing the injected molding compound while each mold passes from said injection station to a mold opening station; sprue blocking means cooperable with said sprue plates to form a seal within the sprues of said sprue plates for blocking said sprues to prevent backrinding of said injected molding compound during the curing thereof, said sprue blocking means comprising a plurality of arms, one for each mold, mounted on said wheel for linear movement in a direction perpendicular to the planes of the plates of the respective molds and for swinging movement through a predetermined arc in planes parallel to the respective planes of said plates, each of said arms being provided with at least one plug pin extending from the arm in the direction of the associated mold and adapted to be inserted into the sprue in the sprue plate of said associated mold to thereby seal said sprue from backrinding after molding compound has been injected into said associated mold; and means connected with the respective plates of each of said molds for opening and closing the latter and for clamping said mold plates together with a force sufficiently high to counteract the tendency of injected molding compound to separate the mold plates subsequent to release of the injection pressure.

24. A rotary injection molding machine comprising a rotatable wheel and intermittent drive therefor; a series of equi-angularly spaced multi-plate molds on said wheel arranged in a circle centered on the axis of rotation of said wheel; injection means positioned at an injection station for injecting molding compound through a sprue plate on each mold when the respective molds are at said injection station; heating means cooperable with said molds for curing the injected molding compound while each mold passes from said injection station to a mold opening station; sprue blocking means cooperable with said sprue plates to form a seal within the sprues of said sprue plates for blocking said sprues to prevent backrinding of said injected molding compound during the curing thereof; means connected with the respective plates of each of said molds for opening and closing the latter and for clamping said mold plates together with a force sufficiently high to counteract the tendency of injected molding compound to separate the mold plates subsequent to release of the injection pressure; means located in the path of movement of a part of said opening and closing means for actuating the latter to release the clamping force and open each mold as the same nears an ejection station and to close each mold and then apply the clamping force thereto as the mold leaves said ejection station and is moved toward said injection station; means constructed and arranged at said ejection station for removing the molded articles from said molds; drill means positioned adjacent said ejection station and movable into the sprues of said sprue plates when the molds are open for clearing the sprues of said sprue plates during the time that the molds are open; and feeding means positioned adjacent to said injection station and responsive to depletion of the amount of molding compound within said injection means below a predetermined value for adding compound to said injection means.

25. In an injection molding machine including at least one mold having a sprue plate through which molding compound may be injected into the cavities of the mold to form molded articles, the improvement comprising injection means cooperable with said sprue plate for injecting molding compound into the mold cavities, said injection means including a cylinder capable of holding therein sufficient molding compound to perform at least two complete cavity filling cycles without being replenished, said injection means also including a piston reciprocally movable in said cylinder; and, mold compound feeding means for replenishing the supply of molding compound in said injection means, said feeding means including a stock cutting mechanism positioned above said injection means and constructed and arranged to sever charges of molding compound from a solid, rod-like source thereof, and transfer means positioned between said cutting mechanism and said injection means for receiving and transferring the charges of molding compound from said cutting mechanism to said injection means, said transfer means including: a chute for guiding the movement of the charges to said injection means; first and second slides alternatingly movable into said chute and engageable with the charges therein for metering the movement of the charges through said chute; and actuating means coupled to said piston and engageable with at least one of said slides upon movement of said piston into said cylinder beyond a predetermined depth for initiating the movement of a charge of molding compound from said chute to said injection means to replenish the supply of molding compound in said injection means.

References Cited in the file of this patent

UNITED STATES PATENTS

| | | |
|---|---|---|
| 452,599 | Dooley | May 19, 1891 |
| 1,674,387 | Campbell | June 19, 1928 |
| 1,842,417 | Matz | Jan. 26, 1932 |
| 2,080,783 | Petersen | May 18, 1937 |
| 2,228,614 | Soubier | Jan. 14, 1941 |
| 2,333,056 | Thoreson | Oct. 26, 1943 |
| 2,413,401 | Youngblood | Dec. 31, 1946 |
| 2,436,993 | Fisher | Mar. 2, 1948 |
| 2,484,777 | Ziska | Oct. 11, 1949 |
| 2,508,301 | Stacy | May 16, 1950 |
| 2,568,332 | Genovese | Sept. 18, 1951 |
| 2,699,574 | Gilbert | Jan. 18, 1955 |
| 2,736,923 | Schieser et al. | Mar. 6, 1956 |
| 2,744,289 | Wanders | May 8, 1956 |
| 2,770,011 | Kelly | Nov. 13, 1956 |
| 2,803,853 | Brazier | Aug. 27, 1957 |
| 2,864,123 | Gora | Dec. 16, 1958 |
| 3,007,197 | Grover | Nov. 7, 1961 |